(12) United States Patent
Sander et al.

(10) Patent No.: US 7,265,752 B2
(45) Date of Patent: Sep. 4, 2007

(54) MULTI-CHART GEOMETRY IMAGES

(75) Inventors: Pedro V. Sander, Cambridge, MA (US); Zoe J. Wood, Santa Barbara, CA (US); Steven J. Gortler, Boston, MA (US); John M. Snyder, Redmond, WA (US); Hugues H. Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 10/755,206

(22) Filed: Jan. 9, 2004

(65) Prior Publication Data

US 2005/0151733 A1  Jul. 14, 2005

(51) Int. Cl.
G06T 15/00 (2006.01)
(52) U.S. Cl. .................. 345/423; 345/428; 345/581
(58) Field of Classification Search ............... 345/581, 345/582, 419, 423, 428, 585, 586
See application file for complete search history.

(56) References Cited

OTHER PUBLICATIONS

Sander et al., Multi-Chart Geometry Images, ACM CCS, Jun. 2003, pp. 146-155.*
Turk et al., "Zippered Polygon Meshes from Range Images," *SIGGRAPH* (1994).
Piponi et al., "Seamless Texture Mapping of Subdivision Surfaces by Model Pelting and Texture Blending," *SIGGRAPH* (2000).
Sander et al., "Texture Mapping Progressive Meshes," *SIGGRAPH* (2001).
Milenkovic, "Rotational Polygon Containment and Minimum Enclosure Using Only Robust 2-D Constructions," *Computational Geometry 13*, pp. 3-19 (1999).
Levy et al., "Least Squares Conformal Maps for Automatic Texture Atlas Generation," *SIGGRAPH* (2002).
Lee et al., "Displaced Subdivision Surfaces," *SIGGRAPH* (2000).
Lee et al., "MAPS; Multiresolution Adaptive Parameterization of Surfaces," *SIGGRAPH* (1998).
Khodakovsky et al., "Progressive Geometry Compression," *SIGGRAPH* (2000).
Hoppe et al., "Mesh Optimization," *Computer Graphics* (1993).
Gu et al., "Geometry Images," *Microsoft Research* (2001).
Garland et al., "Hierarchical Face Clustering on Polygonal Surfaces," *ACM* (2001).
Carr et al., "Meshed Atlases for Real-Time Procedural Solid Texturing," *ACM Transactions on Graphics*, vol. 21, No. 2 (Apr. 2002).
Eck et al., "Multiresolution Analysis of Arbitrary Meshes," *SIGGRAPH* (1995).
Sander et al., "Signal-Specialized Parameterization," *The Eurographics Association* (2002).

(Continued)

*Primary Examiner*—Phu K. Nguyen
(74) *Attorney, Agent, or Firm*—Klarquist Sparkman LLP

(57) ABSTRACT

Techniques and tools for mesh processing are described. For example, a multi-chart geometry image represents arbitrary surfaces on object models. The multi-chart geometry image is created by resampling a surface onto a regular 2D grid, using a flexible atlas construction to map the surface piecewise onto charts of arbitrary shape. This added flexibility reduces parameterization distortion and thus provides greater geometric fidelity, particularly for shapes with long extremities, high genus, or disconnected components. As another example, zippering creates a watertight surface on reconstructed triangle meshes. The zippering unifies discrete paths of samples along chart boundaries to form the watertight mesh.

17 Claims, 19 Drawing Sheets

OTHER PUBLICATIONS

Sheffer et al., "Seamster: Inconspicuous Low-Distortion Texture Seam Layout," *IEEE* (2002).

Sorkine et al., "Bounded-Distortion Piecewise Mesh Parameterization," *IEEE* (2002).

Kanai et al., "Metamorphosis of Arbitrary Triangular Meshes With User-Specified Correspondence," *IEEE* (2000).

Wood et al., "Semi-Regular Mesh Extraction from Volumes," *IEEE* (2000).

Zorin et al., "Interactive Multiresolution Mesh Editing," *SIGGRAPH* (1997).

Cignoni et al., "A General Method for Preserving Attribute Values on Simplified Meshes,"*IEEE* (1998).

Fuchs et al., "Optimal Surface Reconstruction from Planar Contrours," *ACM* (1977).

Kobbelt et al., "A Shrink Wrapping Approach to Remeshing Polygonal Surfaces," *The Eurographics Association* (1999).

Lloyd, Least Squares Quantization in PCM, *IEEE* (1982).

Maillot et al., "Interactive Texture Mapping," *ACM* (1993).

Max, "Quantizing for Minimum Distortion," *PGIT* (1959).

Vorsatz et al., "Feature Sensitive Remeshing," *Eurographics* (2001).

Shlafman et al., "Metamorphosis of Polyhedral Surfaces using Decomposition," *Eurographics* (2002).

* cited by examiner

Figure 16A
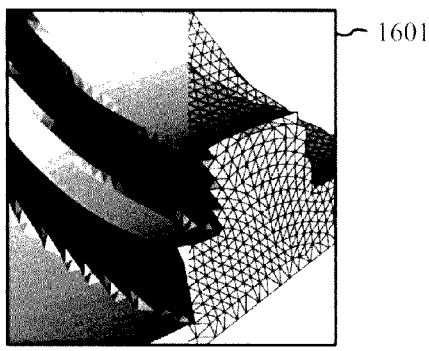
1601
1602
Figure 16B
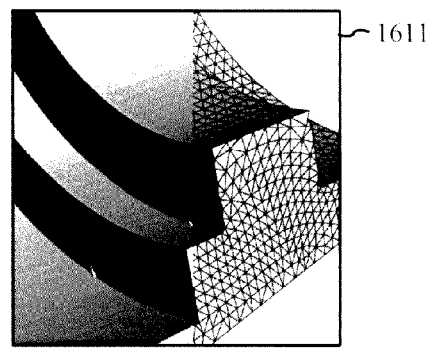
1611
1612

Figure 17

| models | gargoyle | horse | dragon | feline |
|---|---|---|---|---|
| genus | 0 | 0 | 1 | 2 |
| 257x257 GIM from the Gu article | | | | |
| stretch efficiency | 67.8% | 32.4% | 42.2% | 33.3% |
| # defined vertices | 66,049 | 66,049 | 66,049 | 66,049 |
| # unique vertices | 65,537 | 65,537 | 65,537 | 65,537 |
| geometry PSNR | 79.4 | 73.4 | 70.2 | 68.0 |
| normal PSNR | 30.3 | 19.4 | 20.1 | 17.6 |
| 257x257 GIM from the Gu article + geometry image optimization | | | | |
| geometry PSNR | 83.5 | 71.9 | 73.6 | 68.1 |
| normal PSNR | 31.5 | 18.9 | 19.6 | 17.0 |
| MCGIM (equivalent memory cost as the Gu article) | | | | |
| # charts | 15 | 25 | 40 | 50 |
| stretch efficiency | 98.7% | 99.2% | 92.7% | 99.1% |
| packing efficiency | 72.7% | 75.6% | 73.1% | 75.6% |
| dimensions | 466x138 | 281x228 | 369x174 | 478x133 |
| rectangle area | 64,308 | 64,068 | 64,206 | 63,574 |
| # defined vertices | 46,724 | 48,389 | 46,913 | 48,038 |
| # unique vertices | 41,961 | 41,857 | 38,516 | 35,956 |
| geometry PSNR | 83.8 | 84.6 | 77.9 | 79.5 |
| normal PSNR | 33.7 | 30.8 | 22.9 | 28.7 |
| MCGIM (equivalent rendering cost as the Gu article) | | | | |
| # unique vertices | 58,769 | 55,329 | 52,059 | 55,329 |
| geometry PSNR | 85.2 | 85.3 | 79.4 | 82.5 |
| normal PSNR | 35.5 | 30.6 | 23.1 | 30.2 |

Geometry image comparison results

Figure 23
| | semi-regular meshes | | MCGIM approach | |
|---|---|---|---|---|
| | # unique vertices | geom. PSNR | # unique vertices | geom. PSNR |
| feline | 258,046 | 84.4 | 256,862 | 88.3 |
| horse | 112,642 | 87.8 | 99,851 | 90.2 |
Semi-regular remeshing comparison results
Figure 24
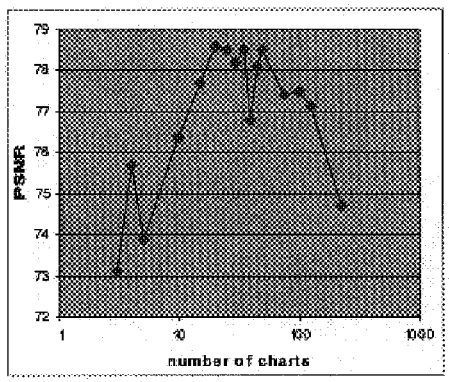
Figure 25
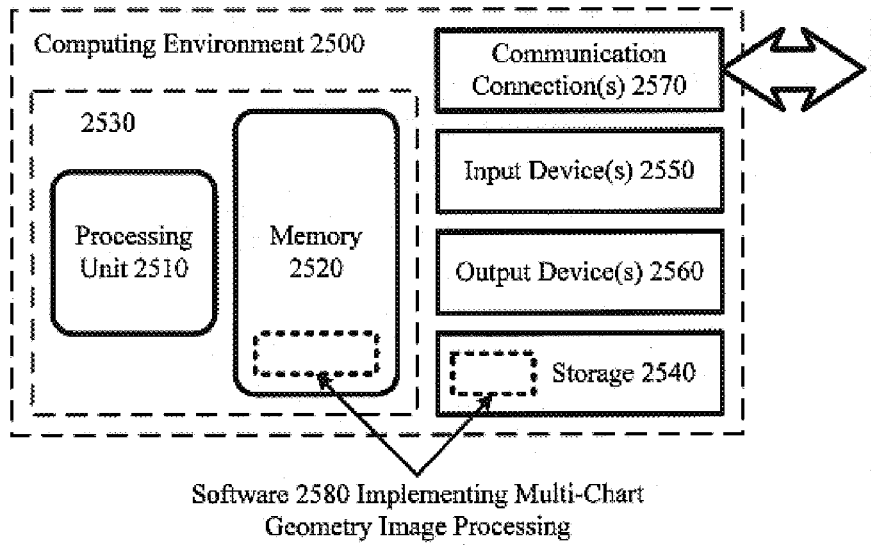
Software 2580 Implementing Multi-Chart
Geometry Image Processing

MULTI-CHART GEOMETRY IMAGES

TECHNICAL FIELD

The invention relates generally to three-dimensional computer graphics. More specifically, the invention relates to new multi-chart geometry image representations and processing techniques for arbitrary surfaces of object models.

BACKGROUND

Computer graphics have evolved from the crude data displayed on monitors, printers or hardcopy plotters of early computers to the computationally complex three-dimensional (3D) images of today. Early computers could not show complex computer graphics primarily because hardware was expensive and computer performance was slow. Since then, advances in technology have caused computer graphics hardware prices to drop dramatically and performance of graphics hardware has drastically improved. At the same time, graphics processing techniques have become more sophisticated and efficient. Today, many desktop computers support 3D computer graphics through improved and relatively inexpensive graphics accelerating hardware (accelerators). Video game consoles also include specialized graphics hardware.

A graphics accelerator is a type of video device that contains its own processor to boost performance levels. These processors are specialized for computing graphical transformations, so they achieve better results than the general-purpose processor (i.e., the central processing unit, or CPU) used by the computer. In addition, a graphics accelerator frees up the computer's CPU to execute other commands while the graphics accelerator is handling graphics computations. One basic function of graphics accelerators is displaying graphical primitives (e.g., lines, polygons, curves, and textual characters). Another basic function is putting constraints on primitives, for example, to enforce how graphical objects move in relation to other objects, such as how a revolving door turns around its pillar or how a drawer moves along runners in its cabinet. Other functions include performing algorithms for dragging objects, rubber-banding (i.e., graphically resizing objects), and transforming (e.g. rotating, scaling, or translating) an image. Graphics accelerators typically also process data structures for storing object models such as geometric models.

I. Geometric Models

Geometric modeling is an important area of 3D computer graphics, which deals with the representation and manipulation of graphical objects in a computer. In early stages, computer graphics were two-dimensional (2D). Displayed objects were defined by complicated and lengthy sequences of drawing commands. For performance reasons, it became important to distinguish between the model of the object to be displayed and the display primitives on the screen at a given time for the object. For objects viewed from different perspectives, distances, or contexts, it became more efficient to represent the object with one model from which different images were rendered as necessary, rather than as a collection of different images (with drawing primitives) for various views. To "render" an object means to create an image for display from the object, considering the object itself and potentially other information such as light sources and perspective. The distinction between the object model and display primitives became even more important in 3D computer graphics because of the increased complexity of the objects and increased display detail.

Today, geometric modeling provides a way to model physical and virtual (computer generated) objects on a computer. In their most basic application, geometric models are computational (symbolic) structures that capture the spatial aspects of the objects of interest. In addition to spatial information, many models store information such as color, texture, and so on to accurately represent objects. These geometric models form the foundation of powerful simulation and modeling tools.

For example, through the use of geometric modeling, computers can perform realistic simulations of car crashes in a non-destructive fashion, analyze the stresses in aerospace structures during flight, and perform pre-surgical planning such as simulating the implantation of an artificial limb.

Moreover, 3D computer graphics have become more important in multimedia and Internet applications. For example, movie special effects and video games are increasingly driven by 3D computer graphics. Online retailers can now showcase online object models of sales items to customers, which allow customers to peruse an item before buying it. All of these and other functions use geometric modeling and illustrate its usefulness.

II. Meshed Object Models Overview

The use of polygonal meshes for the representation of highly complex geometric objects has become the generally accepted standard in most computer graphics applications. The reason for this is that flexible and effective processing and storage techniques have been developed which usually work for models and shapes with arbitrary topology.

A mesh is made up of connected points. In one common kind of model, each of the points has three coordinate values (x, y, z), which correspond to width, height, and depth. Some meshes are entirely computer generated. Other meshes are based on measured data points, where the raw data is obtained by mechanical or optical scanning of an object's surface. Adjacent points may be connected to produce triangles, quadrilaterals, or other polygonal shapes. For example, points are converted into a triangle mesh by connecting nearby points into triangles according to some set of rules. Generally, triangle meshes are preferred due to their algorithmic simplicity, numerical robustness, and efficient display. Geometrically, a triangle mesh has a piecewise surface (e.g. a surface composed of sub-regions or sub-divisions) consisting of triangular shapes (or "faces") joined together along their edges. An advantage of triangle meshes is that they can be used for many stages of the typical processing pipeline in geometric design and graphics applications without the need for data conversion. This decreases the overall processing time and reduces the potential for round-off errors (which are more likely to be introduced with more data conversions).

A regular mesh has uniform patches and a predictable structure and connectivity, which allows for efficient representation and processing in computers. Regularity also enables the use of various signal-processing techniques (e.g., for compression). A drawback of regular meshes is their lack of flexibility in resolving shapes with high genus (an indicator of the number of handles or tunnels on a body bounded by a closed surface) or detail at different levels. In contrast, irregular meshes are more flexible than regular meshes and can better resolve complex geometric features, at the cost of greater complexity in representation and processing.

Once a mesh model exists, it may be analyzed for surface quality (e.g., fidelity to an original surface), representation efficiency, and other criteria. Remeshing modifies the sampling and connectivity of a geometric mesh to generate a new mesh, for example, approximating the first mesh, refining the first mesh, or converting the first mesh to another representation. Remeshing may involve using new or different vertices for a mesh, and also may involve comparing samples from the new mesh to some original highly detailed surface. This process is called resampling.

The number of vertices affects the complexity of a mesh. It also characterizes the computational costs required to display or modify the mesh. Hence, for computationally more expensive operations a mesh with fewer triangles would be preferred. Along that same vein, a high performance computer can handle images and models of greater complexity since they have more computational resources. Other factors such as mesh regularity (discussed below) and mesh shape also may affect computational performance.

III. Regular Remeshing

Regular remeshing is a term describing methods whereby an irregular mesh for an object is approximated by a mesh with regular or semi-regular connectivity. The simplicity of regularly remeshed representation has many benefits. One key benefit is that it eliminates the indirection and storage of vertex indices and texture coordinates. (In a regular mesh, vertices and shape connectivity follow a predictable pattern. Graphics hardware is better able to assess which vertices it will need at any given time and have those loaded in memory.) This allows graphics hardware to perform rendering more efficiently by removing random memory accesses. Thus, memory performance improves.

Of various remeshing techniques, the geometry image (GIM) technique creates the most regular remeshed representation. The GIM technique was introduced by the article X. Gu, S. J. Gortler, and H. Hoppe, *Geometry Images*, SIGGRAPH 2002, pp. 355–361, 2002 ("Gu"). The construction described in the Gu article converts a surface into a topological disk using a network of cuts, and parameterizes the resulting disk onto a square domain. Using this parameterization, the surface geometry is resampled onto the pixels of an image. This technique has some benefits, including the fact that image compression can be directly applied to the remesh. However, the Gu approach of mapping an entire surface to a single square has limitations. First, models having disconnected components require a separate geometry image for each component. More importantly, complicated shapes with many extremities or topological handles/tunnels have distorted parameterizations due to stretching and squashing of the complicated shapes to flatten and fit them into the image. On rendering, every sample within the geometry image is defined since the model fills the image.

A less extreme approach than regular remeshing is to create a remesh with the connectivity of a subdivided base mesh. Examples of this approach are sometimes called semi-regular remeshing, and include methods described in the articles: (1) M. Eck, T. DeRose, T. Duchamp, H. Hoppe, M. Lounsbery, and W. Stuetzle, Multiresolution Analysis of Arbitrary Meshes, SIGGRAPH 1995, pp. 173–182, 1995 ("Eck"); (2) A. Lee, H. Moreton, and H. Hoppe, *Displaced Subdivision Surfaces*, SIGGRAPH 2000, pp. 85–94, 2000 ("Lee 1998"); (3) A. Lee, W. Sweldens, P. Schröder, L. Cowsar, and D. Dobkin, *MAPS: Multiresolution Adaptive Parameterization of Surfaces*, SIGGRAPH 1998, pp. 95–104, 1998 ("Lee 2000"); (4) L. Kobbelt, J. Vorsatz, U. Labsik, and H. P. Seidel, *A Shrink Wrapping Approach to Remeshing Polygonal Surfaces*, Eurographics 1999, pp. 119–130, 1999 ("Kobbelt"); (5) I. Guskov, K. Vidimce, W. Sweldens, and P. Schröder, *Normal Meshes*, SIGGRAPH 2000, pp. 355–361, 2000 ("Guskov"); and (6) Z. J. Wood, M. Desbrun, P. Schröder, and D. Breen, *Semi-regular Mesh Extraction from Volumes*, IEEE Visualization 2000, pp. 275–282, 2000 ("Wood"). For example, a base version (i.e., a coarse, low-detail version) of a mesh is created and sub-divided into base-level triangles, and additional details for the sub-divided base mesh are provided in additional mesh layers. For these representations, special kinds of continuous multiresolution basis functions can be derived that allow multiresolution editing and compression.

These approaches provide a more flexible representation than pure regular remeshing, yet still have constraints that can negatively impact parameterization efficiency. In particular, each chart (here, a surface region associated with a triangle of the base mesh) is effectively parameterized onto an equilateral triangle, which is then evenly sampled. Charts with non-triangular shapes are distorted by the parameterization. For example, charts that are long and skinny are invariably sampled anisotropically (i.e., not exhibiting uniformity along different axes), and are hence distorted. In addition, these remesh techniques require that all charts, regardless of their size or information content, be allotted the same number of samples.

IV. Atlas Parameterization

Another framework for mesh processing and remeshing is atlas parameterization. Some atlas parameterization schemes map individual triangles or pairs of triangles separately into a texture. For example, such techniques are described in the articles: (1) N. Carr, and J. Hart in *Meshed Atlases for Real-time procedural solid texturing*, ACM Transactions on Graphics. 21 (2), pp. 106–131, 2002 ("Carr"); and (2) P. Cignoni, C. Montani, C. Rocchini, and R. Scopigno in *A General Method for Recovering Attribute Values on Simplified Meshes*, IEEE Visualization 1998, pp. 59–66, 1998 ("Cignoni"). Other, more general, chart-based atlas constructions include those described in the articles: (1) J. Maillot, H Yahia, and A. Verroust, *Interactive Texture Mapping*, SIGGRAPH 1993, pp. 27–34, 1993 ("Maillot"); (2) D. Piponi and G. D. Borshukov, *Seamless Texture Mapping of Subdivision Surfaces by Model Pelting and Texture Blending*, SIGGRAPH 2000, pp. 471–478, 1993 ("Piponi"); (3) P. V. Sander, J. Snyder, S. J. Gortler, and H. Hoppe, Texture Mapping Progressive Meshes, SIGGRAPH 2001, pp. 409–416, 2001 ("Sander"); (4) B. Lévy, S. Petitjean, N. Ray, and J. Maillot, *Least Squares Conformal Maps for Automatic Texture Atlas Generation*, SIGGRAPH 2002, pp. 362–371, 2002 ("Lévy"); (5) O. Sorkine, D. Cohen-Or, R. Goldenthal, and D. Lischinski, *Bounded-distortion Piecewise Mesh Parameterization*, IEEE Visualization 2002, 2002 ("Sorkine"); and (6) A. Sheffer and J. C. Hart, *Seamster: Inconspicuous Low-Distortion Texture Seam Layout*, IEEE Visualization 2002, 2002 ("Sheffer").

The Maillot article describes partitioning a mesh into charts based on bucketing face normals. The parameterization method optimizes edge springs of non-zero rest length.

The Piponi article describes manually cutting a subdivision surface using a network of edges. This chart-base atlas construction parameterizes the resulting single chart using a "pelting" analogy, by stretching out the surface boundary using a collection of springs.

The Sander article describes partitioning a mesh using greedy face clustering. The construction parameterizes the resulting charts onto convex polygons using geometric stretch. The charts are packed into a square using a greedy algorithm based on bounding rectangles. Areas between the convex polygons in the square are then filled with valid values.

The Lévy article describes aligning chart boundaries with high-curvature features of the surface. After locating a set of seed faces farthest from sharp features, the technique grows charts about these seeds and merges some of the resulting charts. Additionally, the Lévy article describes parameterizing each chart using least-squares conformal maps with free boundaries and using a Tetris-like packing algorithm that searches for best fit over the horizon of pieces packed so far.

The Sorkine article describes simultaneously growing charts and parameterizing them. The chart growth stops when a distortion limit is reached or if self-overlap is detected. At this point, a new chart is started. The Sorkine parameterization uses a stretch-based metric that penalizes both undersampling and oversampling.

The Sheffer article describes cutting a surface into a single chart by cutting through high-distortion, less-visible surface regions.

A key drawback to these atlas constructions is that none addresses the problem of inter-chart cracks in reconstructions due to resampling geometry images. Reconstructed signals are discontinuous across chart boundaries. Irregular chart outlines do not align with the sampling grid; therefore, boundaries between neighboring charts are generally sampled differently. For geometry images, such signal discontinuities create unacceptable cracks in the surface. In fact, even a few erroneous pixels become glaring artifacts.

Moreover, these atlas construction methods are greedy, thus their trade-off solutions between performance and final product may miss good results.

V. Model Decomposition

Others have investigated model decomposition outside of the context of remeshing. For example, the article S. Shlafman, A. Tal, and S. Katz in *Metamorphosis of Polyhedral Surfaces Using Decomposition*, Eurographics 2002, pp. 219–228, 2002 ("Shlafman") describes a clustering-based approach to mesh partitioning. However, the Shlafman approach is used for morphing and not parameterization, therefore, its clustering distance metric does not account for overall chart planarity.

VI. Zippering

Outside of the context of remeshing, others have investigated how to handle the problem of cracks between meshes during reconstruction. For example, the article G. Turk, and M. Levoy in *Zippered Polygon Meshes from Range Images*, SIGGRAPH 1994, pp. 311–318, 1994 ("Turk") describes reconstructing watertight surfaces from scanned height meshes by "zippering" mesh boundaries together. In their implementation, the desired surface is unknown, which makes their zippering technique a challenging operation. Therefore, there exists a need for a simple, yet robust zippering technique.

Several others have considered the problem of reconstructing surfaces from contours, for example, in the article H. Fuchs, Z. Kedem, and S. Uselton, *Optimal Surface Reconstruction from Planar Contours*, Comm. ACM 20, 1977 ("Fuchs"). The simplest case the Fuchs article describes is that of building a surface ribbon that spans two parallel contour polygons. This involves constructing a ribbon of new triangles along the gap between vertices instead of trying to unify the vertices across the gap.

Previous remeshing and chartification techniques do not provide an adequately efficient and simple 2D representation for arbitrary 3D surfaces, including those with extremities and handles/tunnels. Moreover, previous techniques do not address the problem of cracks between meshes during reconstruction. Finally, previous techniques leave much room for improvement for chartification solutions that are both computationally practical and effective.

SUMMARY

Techniques and tools are presented herein for improving mesh processing. For example, multi-chart geometry images provide an efficient and simple 2D representation for arbitrary 3D surfaces, including those with extremities or numerous handles and tunnels. Several chartification solutions provide computationally practical and effective ways to partition a 3D mesh into charts. And, zippering addresses the problem of cracks between different areas of a reconstructed 3D mesh. The various techniques and tools can be used in combination or separately.

According to a first aspect, a tool such as a mesh processing tool generates a multi-chart geometry image. The tool partitions a mesh into multiple charts with arbitrary, geometrically natural boundaries. The tool then packs the charts into a single geometry image as irregular polygons having arbitrary shapes based on the arbitrary, geometrically natural boundaries. For example, the tool partitions the mesh by iteratively growing the charts and updating seeds for the charts. After the partitioning process is complete, the tool packs the charts onto a geometry image by determining a scaling factor for the charts, selecting dimensions for the geometry image, and finding an appropriate placement for each chart in the image. Even for 3D meshes with extremities or numerous handles/tunnels, the multi-chart geometry image is an efficient and simple representation.

According to a second aspect, a tool such as a mesh processing tool zippers boundaries between charts for a mesh. The tool closes cracks between charts for a reconstruction of the mesh. For example, to close the cracks, the tool identifies cut nodes in the charts, identifies cut paths between adjacent charts, snaps together boundaries of adjacent charts, and clusters together samples if necessary to seal remaining gaps. In this way, the tool provides a "watertight" surface for the reconstruction, preventing cracks that could otherwise appear due to discretization of chart boundaries, for example, in a multi-chart geometry image.

According to a third aspect, a tool such as a mesh processing tool performs atlas chartification. The tool partitions a mesh surface into a geometrically natural set of charts for subsequent parameterization. The partitioning is based at least in part upon iterative clustering for the charts. Thus, the tool partitions the mesh surface into charts in a computationally practical and effective manner.

According to a fourth aspect, a tool such as a rendering tool performs rendering. The tool forms a reconstruction for a mesh from a geometry image, handling one or more undefined samples in the geometry image. The tool then creates an image from the reconstruction. For example, the undefined samples separate multiple charts in a multi-chart geometry image.

Additional features and advantages of the invention will be made apparent from the following detailed description of embodiments that proceeds with reference to the accompanying drawings.

BRIEF DESCRIPTION OF THE DRAWINGS

FIGS. 16A and 16B are color illustrations of reconstructions from multi-chart geometry images before and after optimizations.

FIG. 17 is a table comparing results with single-chart and multi-chart geometry images.

FIG. 23 is a table comparing results with semi-regular remeshing and multi-chart geometry images.

FIG. 24 is a chart relating multi-chart geometry image performance to the number of charts.

FIG. 25 is a block diagram of an exemplary environment for implementing described embodiments.

DETAILED DESCRIPTION

The following description is directed to techniques and tools for chartification, remeshing, and mesh reconstruction. These techniques and tools improve computer graphics performance in several ways. Described techniques and tools provide an efficient and simple 2D representation for arbitrary 3D surfaces, including those with extremities and handles/tunnels. Other techniques and tools address the problem of cracks between meshes during reconstruction. Still other techniques and tools use chartification solutions that are both computationally practical and effective.

Some embodiments involve multi-chart geometry images, which are a new representation for arbitrary surfaces. A multi-chart geometry image ("MCGIM") is a parameterization (e.g., atlas-based) created by resampling a surface onto a 2D grid such as a rectangle. A mesh processing tool partitions the surface into a geometrically natural set of charts, parameterizes the charts individually onto irregular polygons, and packs the polygons into an arbitrarily sized geometry image. The geometrically natural set of charts may include charts with irregular boundaries, forming arbitrary shapes with concave or convex boundaries, or hybrids thereof. Whereas the GIM scheme described in the Gu article maps the entire surface onto a single square, MCGIMs described herein use an atlas construction to map a surface piecewise onto charts of arbitrary shape, which are then packed into a geometry image with those arbitrary shapes. This added flexibility reduces parameterization distortion and thus provides greater geometric fidelity, particularly for shapes with long extremities, high genus, or disconnected components.

Figure 1C:
FIG. 1C is a color illustration of a rendered reconstruction after the remeshing.
Figure 1B:
FIG. 1B is a color illustration of a chart packing layout in an image.
Figure 1A:
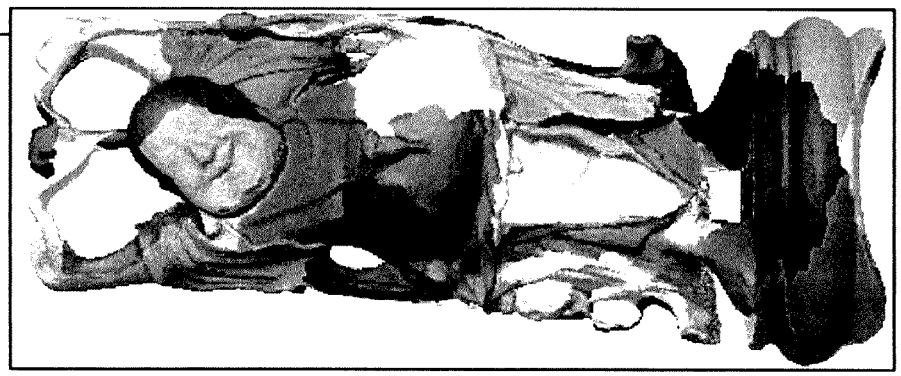
FIG. 1A is a color illustration of an object model mesh partitioned into charts.

FIGS. 1A through 1C illustrate stages of an example of an MCGIM. FIG. 1A shows a chartified original mesh 100, that is, a surface that has been partitioned into charts. Such an atlas parameterization reduces distortion because the smaller charts are easier to flatten and because their parameterized boundaries can assume more natural shapes. Low-distortion parameterizations distribute samples more uniformly over the surface and therefore better capture surface signals. Each chart can be allotted an appropriate number of "defined" samples in the geometry image, separated by "undefined" samples. This representation can be viewed as piecewise regular since it is composed of sub-regions of a regular GIM.

FIG. 1B shows a geometry image 101 into which the charts have been packed. And, FIG. 1C shows a view 102 of the remesh after reconstruction from the charts in the image. MCGIMs retain a key advantage of the original GIMs—rendering involves a simple scan of the samples in stored order. And, MCGIMs overcome the problem of distortion present in GIMs, at the small expense of assigning some samples special "undefined" values.

In some embodiments, zippering algorithms create a watertight surface on mesh reconstructions. This prevents cracks, for example, by unifying vertices across a gap between charts. Thus, a mesh processing tool unifies boundaries of discretized MCGIM charts to create a continuous, watertight model. (In contrast, traditional atlas constructions suffer from discontinuous reconstruction across chart boundaries, creating unacceptable surface cracks.) The zippering algorithms are simple and robust, and typically use a given reference surface.

In some embodiments, new chartification schemes based on clustering optimizations are used. Based upon the general clustering optimization work of Lloyd and Max, these new chartification schemes create compact, roughly flat charts whose boundaries align with the model's creases. Generally speaking, these new chartification schemes are less greedy than previous methods, thus yielding better results.

Other embodiments involve still other improvements to existing atlas parameterization techniques. For example, applying the mesh optimization framework described in the article Hoppe et al., *Mesh Optimization*, SIGGRAPH 1993, pp. 19–26 ("Hoppe"), to refit MCGIM samples to the original surface, improves accuracy considerably. As another example, the "Tetris" packing algorithm described in the Lévy article is extended to consider both chart rotations and overall domain dimensions.

Results indicate MCGIMs outperform both single-chart geometry images and semi-regular remeshes on example models.

While the techniques and tools are described in places herein as part of a single, integrated system, the techniques can be applied separately, potentially in combination with other techniques.

A mesh processing tool performs one or more of the various techniques. Alternatively, some other kind of tool performs one or more of the techniques. Moreover, although the operations for these techniques are typically described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts typically do not show the various ways in which particular techniques can be used in conjunction with other techniques.

I. Mesh Processing Tool

Figure 2:
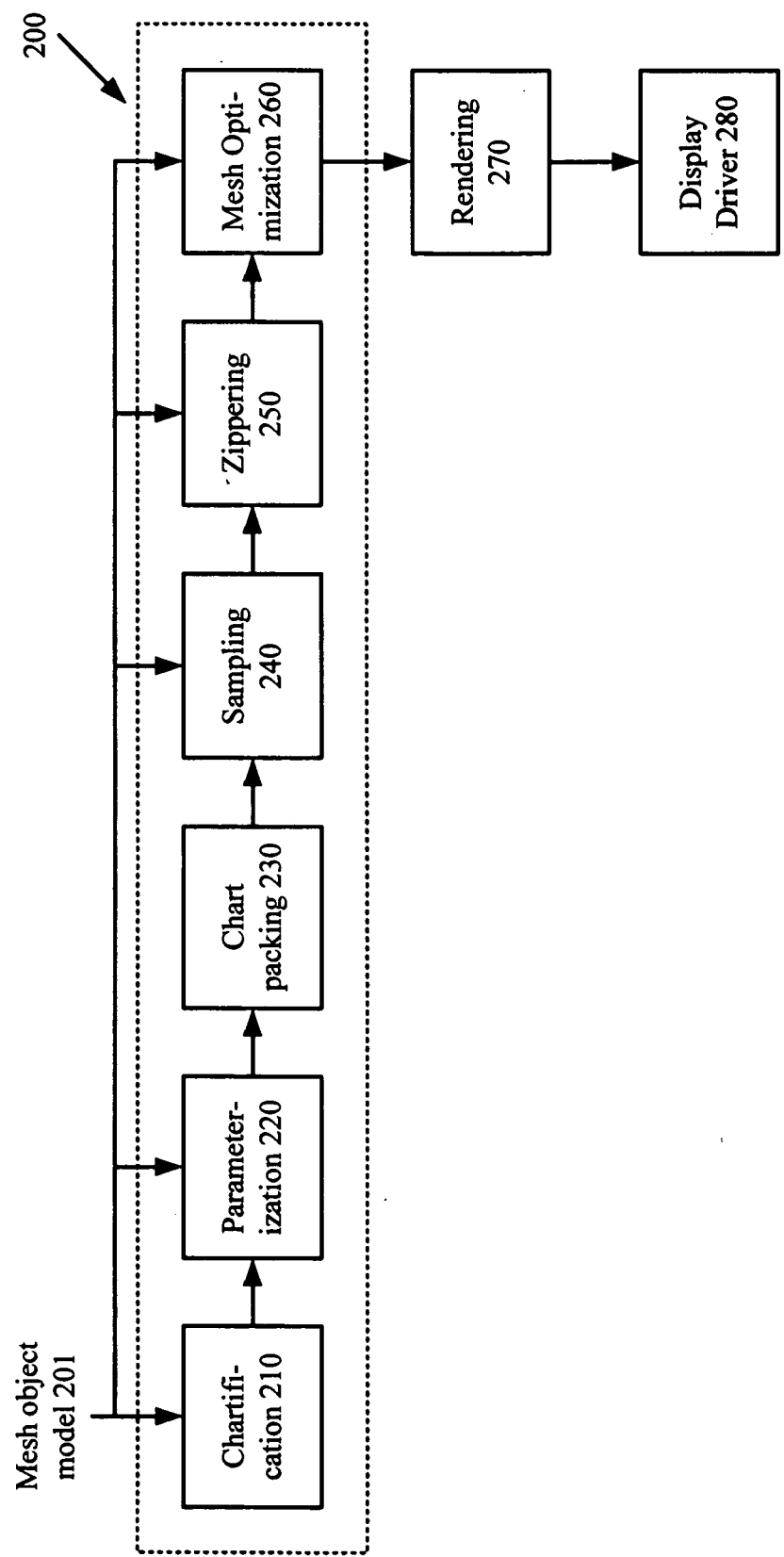
FIG. 2 is a block diagram of a mesh processing tool.

FIG. 2 shows an exemplary mesh processing tool 200 in which the techniques described herein may be implemented. This system includes elements of software and/or hardware. As input, the tool 200 works with a geometric model 201, which can be a triangulated mesh or other representation of the geometry of the real or virtual object being modeled. The tool 200 produces MCGIMs that may be subsequently processed for compression, decompression, rendering, or other operations.

In particular, FIG. 2 is a block diagram showing the various modules of the mesh processing tool 200. These modules include modules for chartification 210, polygon parameterization 220, chart packing 230, sampling 240, zippering 250, and mesh optimizations 260.

The relationships shown between modules within the mesh processing tool 200 indicate the main flow of information; other relationships are not shown for the sake of simplicity. Depending on implementation, modules of the tool can be added, omitted, split into multiple modules, combined with other modules, and/or replaced with like modules. Alternatively, a tool with different modules and/or other configurations of modules performs the MCGIM, zippering, chartification, and/or other mesh processing techniques described herein.

The chartification module 210 partitions the object model 201 into charts and produces a set of charts. The number of charts can be static or adaptive for the object model, defined for the tool or defined by the user. For example, the chartification module 210 uses clustering in which clusters (here, charts) are determined by iteratively (1) partitioning elements (here, mesh faces) according to current cluster models, and (2) refitting a model (here, a seed face for each chart) to each cluster, until a termination condition is reached. Alternatively, the tool includes additional and/or different modules for chartification.

From a set of charts, the polygon parameterization module 220 produces a set of charts parameterized on a continuous domain. For example, the polygon parameterization module 220 uses a hierarchical parameterization algorithm.

Alternatively, the tool includes additional and/or different modules for chart parameterization.

The chart packing module 230 and sampling module 240 work to pack the charts into an image and discretize the packed charts. For example, the chart packing module 230 evaluates packing orientations for different scaling factors for the charts, different chart orientations, and different image dimensions, and the sampling module 240 samples the chart boundaries and/or the packed charts. Alternatively, the tool includes additional and/or different modules for chart packing and/or sampling.

The zippering module 250 accepts a set of charts packed into an image and "zippers" boundary samples along discrete boundaries of charts that adjoin on the 3D surface, which prevents cracks in the reconstructed mesh. For example, the zippering module 250 identifies "cut-nodes" in the mesh, identifies "cut-paths," snaps boundary samples to the cut-path, and unifies boundary samples. Alternatively, the tool includes additional and/or different modules for zippering.

The mesh optimization module 260 optimizes samples in a "zippered" MCGIM to improve geometric fidelity to the original mesh. For example, the mesh optimization module 260 uses mesh optimization techniques described in the Hoppe article. Alternatively, the tool includes additional and/or different modules for mesh optimization.

A rendering module 270 uses data received from the tool 200 to render the modeled object. In a desktop computer, the rendering module 270 works with a display driver 280 to output images to an output device (e.g., to a monitor, projector, printer, or like device). The rendering module 270 is on the same computer as the various modules of the tool 200. Alternatively, the modules of the tool 200 can be run on a separate computer, and the resulting data then transferred to the computer on which the rendering module 270 runs to display graphics images.

II. MCGIM Representation

Returning to FIGS. 1A through 1C, recall that a MCGIM is a rectangular 2D grid whose entries store 3D points sampled from a given surface. A MCGIM consists of multiple, arbitrarily shaped charts packed together into a grid. The charts may have irregular boundaries to form arbitrary shapes such as concave or convex polygons. FIG. 1B shows various color coded charts packed into a MCGIM 101, where the packed charts in FIG. 1B are discretized (i.e., sampled) versions of the charts on the model 100 in FIG. 1A (after parameterization to flatten the charts, etc.). Charts are color-coded in the figures to help distinguish between charts, but the colors do not indicate values for samples or pixels per se.

The 2D representation of the MCGIM stores coordinate (x, y, z) data values representing 3D points sampled from a reference surface. Like some 3D representations, this 2D representation is compact because connectivity information is implicit—how various vertices and faces connect together is deduced from the stored coordinates. Hence, fewer computer storage resources are required for the object. In addition, the 2D representation makes it easy to associate colors and textures to the object. For example, in some implementations, the 2D array of data values may further comprise color coordinates from a standard RGB coordinate map. Or, two 2D images may be used to represent a single object— one image to represent the geometry of an object model and the second image to represent the colors associated with each sampled area of the object. Texture may be similarly incorporated into the 2D image model. Also, the relationship between resolution (i.e., samples) in the 2D image and sampling resolution for the 3D mesh is relatively simple and intuitive. Thus the 2D representation provides a flexible and simple basis for representing a 3D model. Moreover, the 2D representation lends itself to application of many current image filtering and compression techniques.

In most representations, there will be some samples in the image that lie outside packed charts. These samples are called undefined samples. In FIG. 1B, the undefined samples are the yellowish samples separating the charts of various colors. Samples that lie within the charts (including chart boundaries) are called defined samples. Defined samples fall into two main categories: boundary samples and interior samples. A boundary sample is a sample with at least one undefined sample among its four immediate neighbors. An interior sample, therefore, is a sample where all of its four immediate neighbors are defined samples. The defined region of the image is specified either using a bitmask or by storing NaN (Not-a-Number) into the coordinate values of undefined samples.

FIG. 1C illustrates a view 102 of a surface reconstructed from the MCGIM 101 shown in FIG. 1B. In order to reconstruct a surface from the MCGIM 101, polygon faces are formed from the data represented by 2D grids. For a 2 by 2 quad of samples (i.e., a square of 4 points in the 2D grid), the number of defined samples is examined. If fewer than three of the samples in the examined area are defined, no polygon is formed. If exactly three samples are defined, a triangle is formed. And if all four samples are defined, two triangles are created, with the separating diagonal chosen to be the shorter of the two diagonals in the 2 by 2 quad, according to 3D distance. Applying this method to the quads in the image 101 creates a triangle mesh, which can be fed through an image rendering engine or graphics pipeline for rendering. Notably, some triangles may in fact be degenerate due to zippering (for example, when two vertices of a triangle come together and the triangle becomes a line, as discussed below); such degenerate triangles can be removed during reconstruction, or, alternatively, they can be fed to the graphics pipeline as extra points since they will have no effect on rendering.

For rendering, an image rendering engine computes surface normals at each sample point of a MCGIM using one of a variety of techniques. For example, one technique for computing the surface normal at a point involves calculating the normalized cross product of its neighbor's mathematically designated central differences. When an adjacent sample is undefined, it is replaced by the current sample in the central difference. On a manifold mesh, opposite sample neighbors cannot both be undefined.

Ultimately, the goal of MCGIM construction is to create watertight meshes, i.e. a 2-dimensional manifold where every edge is adjacent to exactly two faces and every vertex is adjacent to exactly one ring of faces. MCGIMs can represent meshes with several connected components, as well as meshes with boundaries (where some edges are adjacent to only one face).

III. MCGIM Creation

Figure 3:
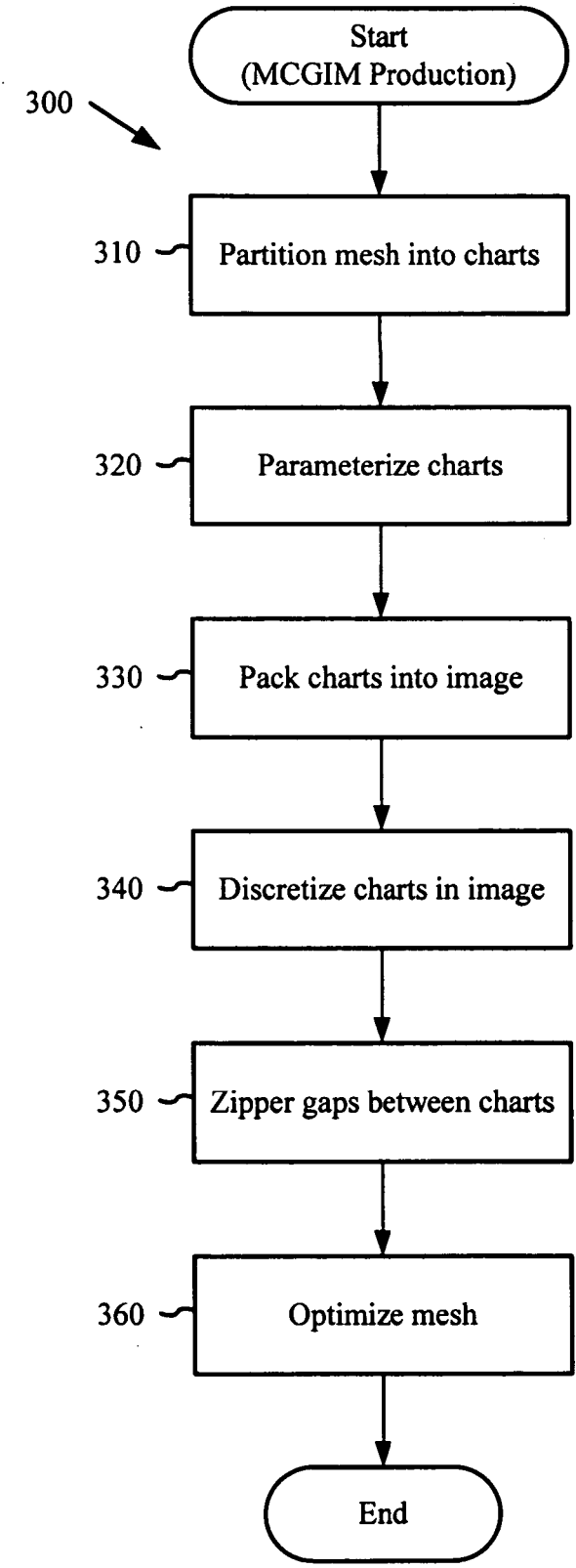
FIG. 3 is a flowchart showing a technique for producing a multi-chart geometry image.

FIG. 3 illustrates a technique 300 for creating a MCGIM. A tool such as the mesh processing tool 200 shown in FIG. 2 performs the technique 300, and the ordering of stages in the technique 300 generally tracks the modules of the tool 200. Alternatively, another tool performs the technique 300.

The mesh processing tool creates a MCGIM by partitioning a mesh into multiple charts 310 and parameterizing the charts 320. The tool packs the charts into an image 330, iteratively evaluating different packing layouts for the charts, and discretizes the charts 340. The tool zippers boundary samples 350 and performs further optimizations 360 to improve geometric fidelity to the original mesh. FIG. 3 provides a map for the various stages of the technique 300, which are described in detail below. Alternatively, various stages of the technique 300 are separately or in various combinations performed in conjunction with other stages.

A. Mesh Chartification

As illustrated in FIG. 3, a first phase in producing a MCGIM is partitioning the mesh into charts 310. Charts that have compact boundaries and are mostly flat yield better parameterization and packing results. Moreover, they reduce the distortions in the image.

In one implementation, the chart merging approach of the Sander article (cited above) is used to chartify a mesh. The Sander approach applies a greedy face clustering algorithm to a model, which produces charts with irregular boundaries. To adjust the irregular boundaries, the Sander article describes applying a straightening scheme to the charts' boundaries.

Figure 4A:
FIGS. 4A and 4B are color views of an object partitioned into charts according to a prior art chartification technique.
Figure 4B:
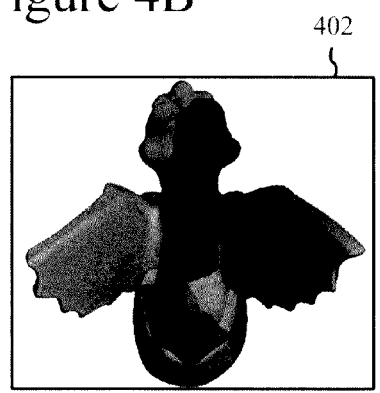

A problem with the Sander technique is that usually boundaries do not follow the "creases" of the model, unless a high number of charts are used. Thus, to create a mesh in which relatively flat charts follow creases of the model, a high number of charts and resource expensive chartification computations are required. For instance, FIGS. 4A and 4B illustrate the results of a Sander chartification. FIG. 4A illustrates a front view 401 of a gargoyle object partitioned into charts. FIG. 4B shows a top view 402 of the object partitioned into Sander charts. Upon completion of Sander chartification (including the straightening step), each of the gargoyle wings is composed of a single chart. If a single chart stretches across folds/creases of the model, it is harder to parameterize that chart well for subsequent packing into an image, due to the stretching and/or compaction of different parts of the chart as it is flattened. (In contrast, using different charts separated at the folds/creases results in charts that are already flatter.)

This observation motivated the writers of the Lévy article to develop an algorithm that aligns chart boundaries with high-curvature features. The Lévy article describes estimating sharp features using local edge dihedral angles, identifying the seed faces farthest from sharp features, and growing charts about these seeds. The Lévy approach improved upon the Sander approach in some ways, but it still has its limitations such as a feature detection requirement and lack of a good general optimization technique. Several techniques described herein use a more general optimization and chartification technique and do not require feature detection.

1. Chartification with Iterative Chart Growth and Seed Updating

Several techniques described herein employ an algorithm inspired by Lloyd-Max quantization, which partitions sets of elements into a fixed number of clusters. The basic strategy is to iteratively optimize the clusters using two main phases: (1) partitioning the elements according to current cluster models (chart growth phase) and (2) refitting a model to each cluster ("seed computation phase). The strategy also uses bootstrapping and tests termination conditions.

Figure 5:
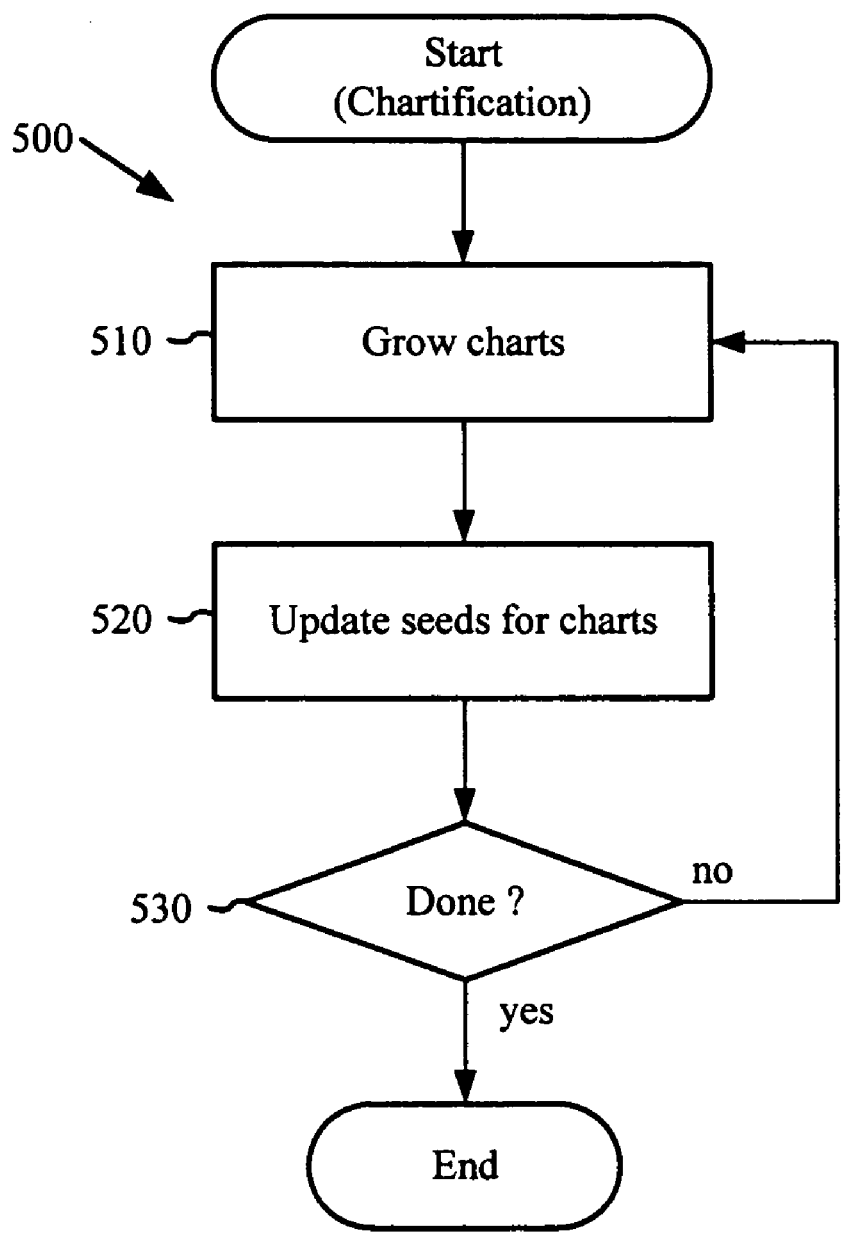
FIG. 5 is a flowchart showing a technique for partitioning an object into charts.

In this context, elements are mesh faces, clusters are charts, and the clustering model tracks a seed face for each chart. FIG. 5 shows a technique 500 for chartification of an object. A tool such as the mesh processing tool 200 of FIG. 2 performs the technique 500. Alternatively, another tool performs the technique 500.

In the chart growth phase, the tool grows charts 510 according to the following rule: given n seeds representing n charts, assign each mesh face of the model to a chart. For example, the tool partitions elements (mesh faces) by growing all the charts simultaneously using a Dijkstra search algorithm on the "dual graph" of the mesh. A dual graph is a graph theory construct. In this case, the graph connects each pair of adjacent mesh faces by an edge. Edges are assigned a cost that encourages charts to be planar and to have compact boundaries. Specifically, the edge cost between a face F on a chart C and its adjacent face F' that is a candidate to join C is a measure of geometric distance between the two faces and the difference in normal between F' and the chart normal $N_C$:

$$\text{cost}(F, F') = (\lambda - (N_C \cdot N_{F'}))(|P_{F'} - P_F|) \qquad (1),$$

where $N_C$ is the normal of the chart containing F (the average normal of all faces already in the cluster), and $P_{F'}$ and $P_F$ are the centroid points of F' and F. The parameter $\lambda$ regulates the relative weight between the normal and geometric distance terms. In one implementation $\lambda$ is 1. In other implementations, $\lambda$ may have other values such as 1/3, 1/2, 2, 3, 4, 10, 21, etc. The chart growth phase 410 terminates when all faces have been assigned to charts. Alternatively, the tool uses additional and/or different search algorithms, distance measures, or graph constructs.

In the seed computation phase, the tool updates 520 the seed for each chart, given a chartified mesh. For example, the tool updates the seed of each chart to be the "most interior" face within the chart. To find this face, a Dijkstra search is performed on the dual graph of the mesh, but in the opposite direction. The search begins from all faces adjacent to a chart boundary. The edge cost is simply the geodesic distance:

$$\text{cost}(F, F') = |P_{F'} - P_F| \qquad (2).$$

The last face reached within each chart becomes its new seed. Alternatively, the tool uses additional and/or different search algorithms, distance measures, or graph constructs.

The tool then evaluates 530 whether the chartification is finished, and if not, repeats the chart growth 510 and seed updating 520 phases. For example, the tool repeats the chart growth phase 410 and seed computation phase 420 until the new seeds are identical to those of the previous iteration, thus indicating convergence. Alternatively, the tool uses additional and/or different termination conditions. Occasionally, seed values fail to converge because the seeds begin to cycle between nearby faces (indicating nearly identical chartifications). In one implementation, such cycles are detected by checking the set of seeds against the ones obtained in previous iterations. If a cycle is detected, any chartification in the cycle is acceptable.

The number n of charts can be static or adaptive for the object model. Thus, the same number of charts can be used no matter the effectiveness, or the number of charts can vary to trade-off the number vs. ease of parameterization. In addition, the number n of charts can be initially set or defined by the tool or by the user. For example, in some implementations, in order to bootstrap the chartification process, the tool assigns a random face as the first seed to begin generating charts. Once the initial seed has been selected, the tool runs successive iterations of chart growth phase 410 and seed computation phase 420 with one small modification: at the end of chart growth phase 410, if a desired number of seeds has not been reached, a new seed is added. The new seed is set to be the last face that was assigned to a chart during the chart growth 410 phase. This tends to place the new seed far away from the other seeds. Once the desired number of seeds has been reached, the chart growth phase 410 and seed computation phase 420 are repeated without adding new seeds. The seeds may keep changing, but the number of seeds stays the same. The tool also ensures the formation of proper chart topology. For example, chart topology may require that charts are topological disks and the formation of rings in charts and boundaryless charts (closed charts) is not allowed. To enforce these constraints, the tool performs a simple local check on the chart boundary during chart growth to ensure proper chart topology. As a result of these constraints, however, there may be situations where a face cannot be assigned to any chart. When that happens, the first face that failed this constraint check is added as a new seed. Then the new seed is grown (along with the other seeds) according to the chartification algorithm. For example, under the preceding constraints, a sphere cannot be accurately chartified with only one chart. So, if one chart is requested to represent the sphere's geometric data, more seeds are inserted automatically, thus avoiding a closed chart. Alternatively, the tool ensures the formation of proper chart topology according to additional and/or different criteria.

2. Results

Figure 6A:
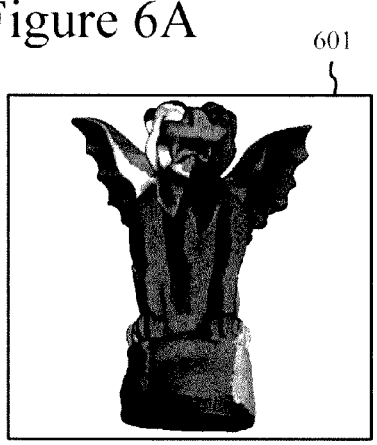
FIGS. 6A and 6B are color views of an object partitioned into charts according to the technique of FIG. 5.
Figure 6B:
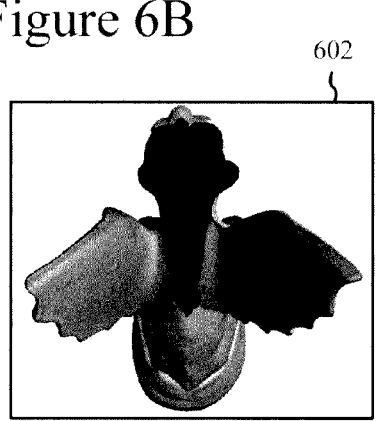

The chartification approach described herein produces better results than previous techniques such as those described in the Sander and Lévy articles. FIGS. 6A and 6B show an object partitioned into charts according to the technique of FIG. 5. (For the sake of comparison, in FIGS. 4A, 4B, 6A, and 6B the object is a 12-chart gargoyle with the same original model.) FIG. 6A illustrates a front view 601 of the object, and FIG. 6B illustrates a top view 602 of the model. FIGS. 6A and 6B show that the front and back of the ears and wings of the gargoyle model are each assigned their own chart. Also, the chartification is much more symmetric when compared to the Sander charts of FIGS. 4A and 4B. FIG. 6B in particular illustrates the chart symmetry achieved by the chartification algorithm shown in FIG. 5.

To further evaluate the results of the two different chartification approaches, parameterize both chartified models and calculate their stretch efficiencies. The stretch efficiency measures the distortion of a given parameterization compared to the original model. The Sander model in FIGS. 4A and 4B has a stretch efficiency of just 80% (due primarily to the high stretch on the gargoyle wings). In contrast, the chartified model in FIGS. 6A and 6B has a near optimal stretch efficiency of 99%.

B. Chart Parameterization

As illustrated in FIG. 3, a second phase in producing a MCGIM is parameterizing the charts 320. To parameterize the charts, a mesh processing tool parameterizes the charts into a continuous domain (later sampling depends on this parameterization). There are numerous techniques for parameterization of charts.

In one implementation, the parameterization minimizes the $L^2$ geometric stretch metric disclosed in the Sander article. This metric penalizes undersampling and tends to result in samples uniformly distributed over the mesh surface. Moreover, the stretch metric, as shown in the Sander article, is a predictor of the reconstruction error under the assumption of locally constant reconstruction. The tool allows chart boundaries to be free during parameterization optimization, instead of fixing chart boundaries to a square like the Sander and Gu articles, which further reduces the stretch metric. In particular, the tool employs the hierarchical parameterization algorithm from the Sander article to solve minimization, improving quality and convergence speed. This hierarchical algorithm finds better minima than other techniques, and is orders of magnitude faster than uniresolution methods. Once all the charts are parameterized, they are scaled relative to each other based on their stretch. Alternatively, the tool uses additional and/or different parameterization techniques.

C. Chart Packing

As illustrated in FIG. 3, the next phase in producing a MCGIM is packing the charts into an image 330, which involves iteratively evaluating different packing layouts for the charts. Packing a set of 2D charts into a single grid is a hard problem, typically requiring heuristic approaches. There are several different techniques for packing charts into an image.

Figure 7A:
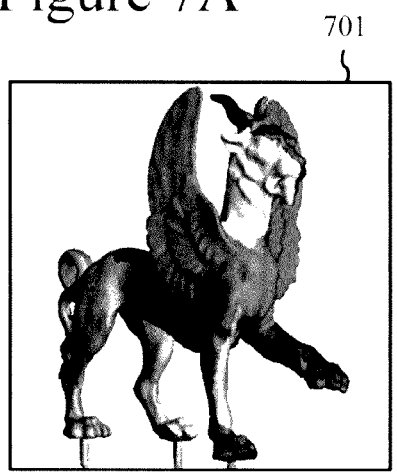
FIG. 7A shows a color illustration of an object model divided into charts.
Figure 7B:
FIG. 7B is a chart packing layout for the chartified object of FIG. 7A according to a prior art packing algorithm.

For example, a mesh processing tool uses an algorithm that is a simple extension of the "Tetris" packing algorithm disclosed in the Lévy article. The Lévy scheme iteratively adds charts to a square image while keeping track of a "horizon" that bounds the charts packed so far. For each new chart to be inserted, the Lévy scheme locates the horizontal position that minimizes the wasted vertical space between the current horizon and the new chart. FIG. 7A shows an object model 701 divided into 50 charts, and FIG. 7B shows a chart packing layout 702 for the object 701 according to the Lévy scheme. The packing efficiency (the percentage of the image made up of defined samples) is 58.0% for the layout 702 in FIG. 7B.

Or, a mesh processing tool uses several enhancements to the Lévy packing scheme to dramatically improve its performance. For example, the tool considers 16 orientations for each chart, although more or less orientations may be considered. And, the packing domain is an arbitrary rectangle, rather than a fixed-sized square. This is relevant since current graphics hardware can support textures with arbitrary dimensions. In one implementation, a user specifies a desired upper bound on the total number of MCGIM samples, and the tool selects an optimal rectangle for the bound. In other implementations, the number of samples is automatically selected and the chart size is constrained in some other way.

Figure 7C:
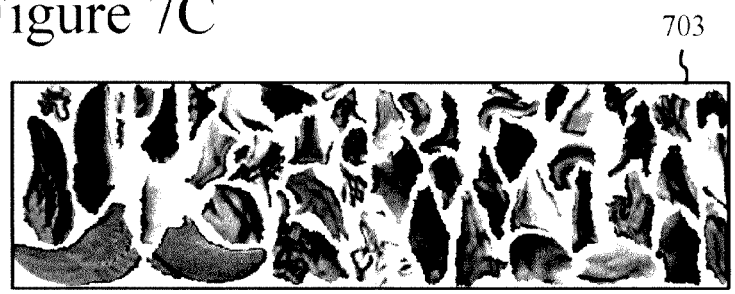
FIG. 7C is a chart packing layout for the chartified object of FIG. 7A according to the technique of FIG. 8.

FIG. 7C shows a chart packing layout 703 for the object 701 according to the enhanced scheme, considering 16 orientations for charts and allowing arbitrary rectangle shapes for the image. The packing efficiency is 75.6% for the layout 703 in FIG. 7C.—a tremendous improvement over the basic Lévy chart packing algorithm.

Figure 8:
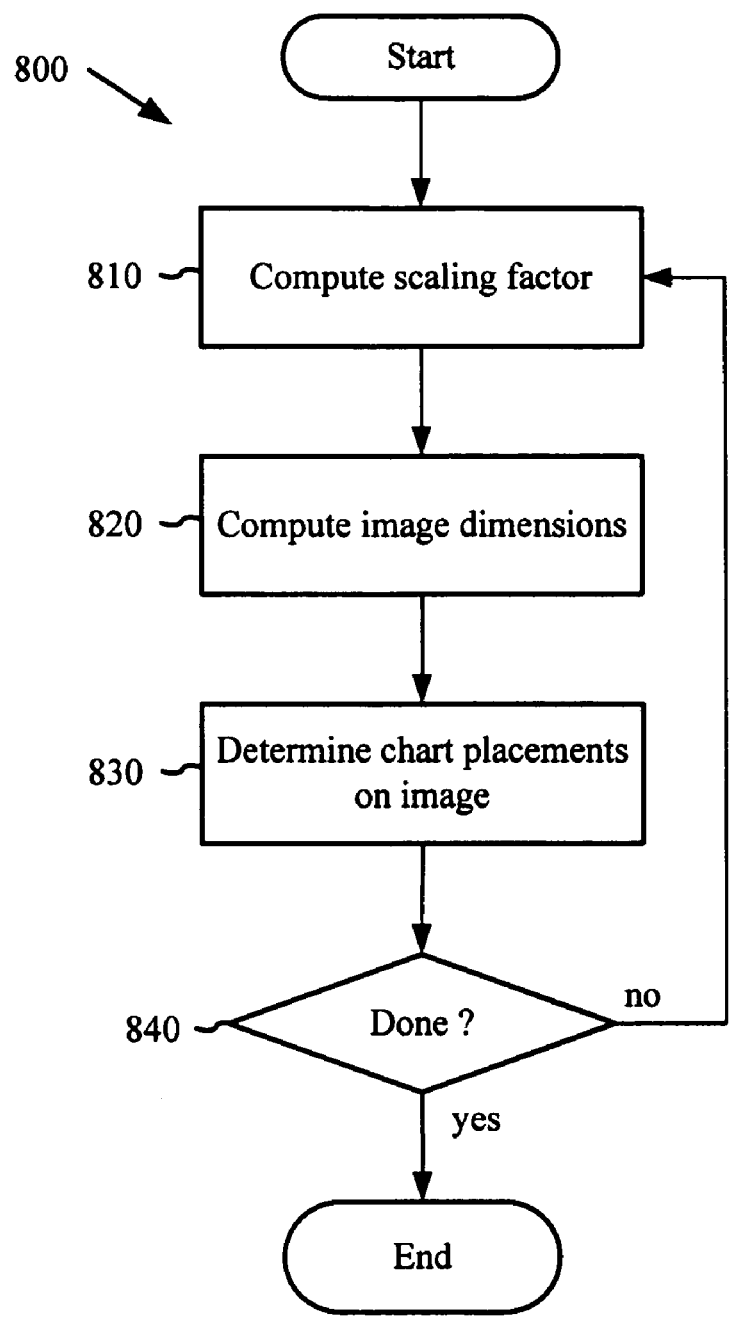
FIG. 8 is a flowchart of a technique for packing charts into a layout.

FIG. 8 shows a technique 800 for packing charts into an image. A tool such as the mesh processing tool 200 of FIG. 2 performs the technique 800. Alternatively, another tool performs the technique 800.

First, the tool computes a scaling factor 810 for the charts, which are parameterized in the continuous domain. The scaling factor determines how the continuous charts map to the discrete image grid. That is, the scaling factor affects the number of samples that will be used later for the charts in the image grid. In one implementation, the scaling factor is initially set based on the assumption that the tool will achieve a packing efficiency of 100% in the grid. If successful packing is not achieved, the scaling factor is successively reduced by 1% in subsequent iterations, until successful packing is achieved. For each scaling factor, the charts are rasterized into a buffer to obtain their discrete shapes, where the shapes are later used for packing decisions. Rasterization is done to ensure chart topology, e.g., to prevent charts from breaking into disconnected components. This concept is discussed in more detail below. Alternatively, the tool uses additional and/or different mechanisms to scale the charts.

Next, the tool computes the image dimensions 820 for the image where the charts will be packed, varying the sides and overall size of the image within applicable constraints. For example, for a given chart scale, the tool operates two nested loops, which consider MCGIM widths and heights whose product (in terms of samples) is less than an upper bound on the total number of MCGIM samples. In one implementation, the aspect ratio (the ratio between the width of the picture and the height of the picture) is limited to less than 4. In other implementations, the aspect ratio has different limits.

Figure 9:
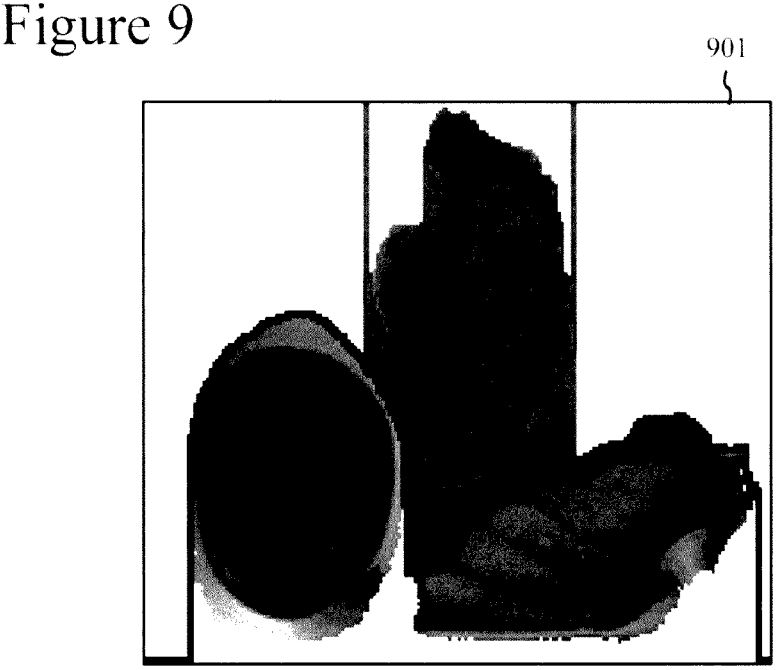
FIG. 9 is a color illustration of criteria for evaluating chart placements in an image.
Figure 10A:
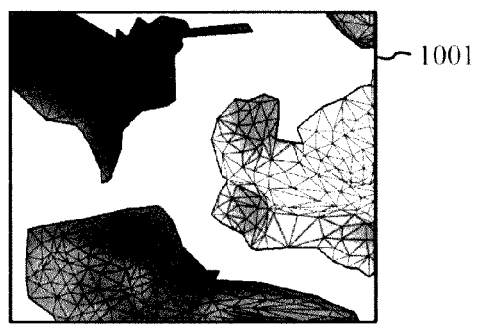
FIGS. 10A and 10B are color illustrations of the packed charts before and after discretization, respectively.
Figure 10B:
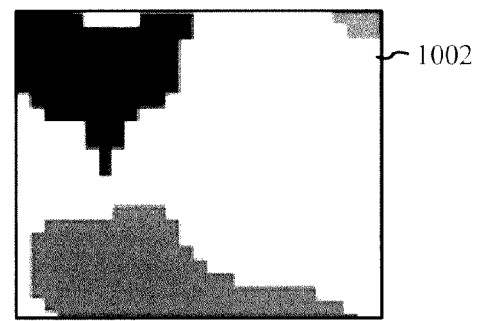

The tool then determines chart placements 830 on the image, evaluating different locations and orientations for the charts in the image. For example, the tool examines various locations and orientations in order to determine a chart placement strategy that minimizes wasted space in the image. FIG. 9 shows several criteria for evaluating chart placements in an image according to one implementation. The large red region is wasted space between the discretized upper horizon of the charts already in the image (black line) and the discretized lower horizon of the chart being evaluated (green line). There is also wasted space within the intersection of the upper and lower envelope of the new chart (the smaller red region in the upper-left), since the space is unused and a different rotation may avoid that wasted space. Alternatively, the tool uses additional and/or different placement strategies or criteria.

At the end of an iteration, the tool determines 840 whether the packing has finished. If not, the tool continues with the next iteration of the technique 800. For example, the tool determines whether packing was successfully achieved for a given scaling factor and, if not, continues with an incrementally reduced scaling factor. Alternatively, the tool uses additional and/or different termination conditions.

D. Geometry Image Sampling

Once the desired scale and orientations of the charts within the image have been determined, the surface charts are discretized 340 into the image. The pixels of the image take as values (x, y, z) positions sampled from the surface of the object model. FIG. 10 shows portions of continuous charts 1001, which are discretized, resulting in the portions of sampled charts 1002.

The set of defined image samples implicitly creates a triangulation, for example, using the rules described earlier in connection with FIGS. 1A–1C. This triangulation maintains the same topology as the original surface as long as the following two conditions have been satisfied: (1) the discretized charts are topological disks (the continuous surface charts are known to be topological disks, as discussed above) and (2) the charts are connected together without cracks (the explicit chart boundaries on the original mesh help to satisfy this condition). The first condition is addressed below. The second condition is addressed below in the section entitled "Geometry image zippering."

The tool rasterizes each chart's 3D triangles into the 2D image domain using a scan conversion technique. During rasterization, the value stored in the image domain sample is the corresponding (x, y, z) location from the 3D triangle. Thus, samples for packed charts are written to the 2D image. Unwritten samples (those not in charts) remain undefined.

Figure 11A:
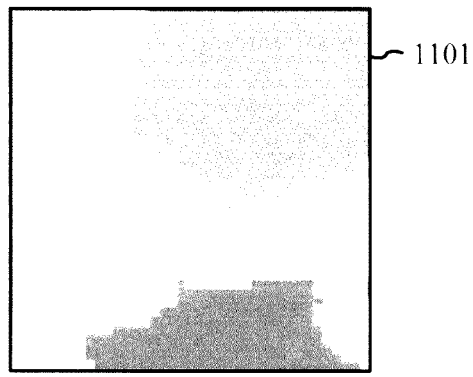
FIGS. 11A–B are color illustrations of discretized packed charts before and after boundary rasterization, respectively.

This procedure does not guarantee that the rasterized charts will have disk topology. For example, undersampling a narrow chart "peninsula" leads to broken charts, as illustrated in the discretized chart portions 1101 of FIG. 11A. Hence, disk topology may be broken if only interior rasterization is used.

Figure 11B:
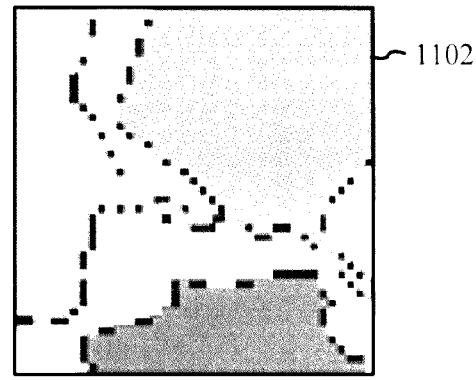

To prevent charts from breaking into disconnected components, the tool rasterizes chart boundary edges to add connecting samples as shown in the discretized packed charts 1102 of FIG. 11B. As necessary or for each boundary edge, a 1-pixel wide rectangle centered along the boundary edge (called a boundary-polygon and shown in red) is constructed, and scan-converted to the texture domain. During this boundary rasterization, undefined samples covered by the boundary-polygon are labeled as defined and filled in with the closest geometric point on the boundary. Previously defined samples are not overwritten. This process helps ensure that charts are properly connected.

Figure 12A:
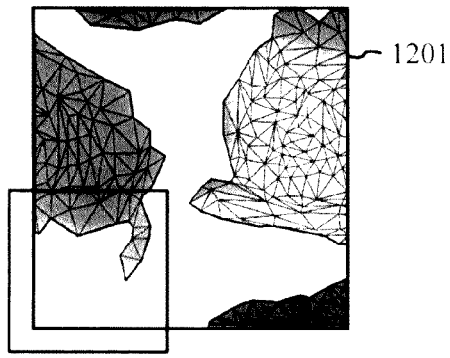
FIGS. 12A–C are color illustrations of packed charts before discretization, after discretization but before local dilation, and after local dilation.
Figure 12B:
Figure 12C:
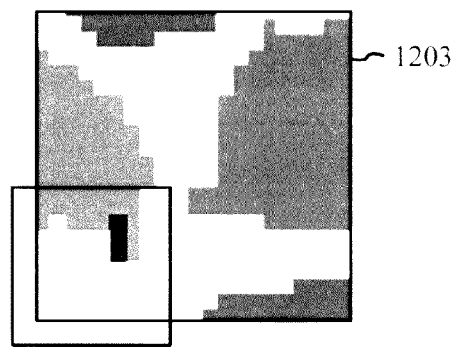

Even with boundary rasterization, however, a discrete chart can have a non-manifold reconstruction at boundary samples, as illustrated by FIG. 12B. Non-manifold reconstruction occurs when samples on a chart are pinched so that the discretized charts lose geometric fidelity. FIG. 12A illustrates portions of packed charts to be discretized. In the smaller square is highlighted a peninsula portion of one of the charts to be discretized. In FIG. 12B, the now discretized chart has a single line peninsula of defined samples, which will not produce any triangles on reconstruction. Reconstructions may also erroneously produce two triangles touching at a single vertex. To correct these non-manifold neighborhoods, the tool locally extends (dilates) the chart to include additional samples. FIG. 12C shows the discretized charts after local dilation. For each non-manifold sample p, the tool makes the sample manifold by making "defined" a minimal number of its undefined neighbors. The tool assigns these new samples the same position as p. This process is iterated until all samples are manifold.

In theory, there may be cases when this process fails, particularly when the requested geometry image area is small. For example, some discretized charts could become annuli for coarse samplings. For practical image resolutions, however, these failures are not a problem.

Alternatively, the tool uses additional and/or different triangulation rules or discretization conditions.

E. Geometry Image Zippering

Referring again to FIG. 3, the next phase in producing a MCGIM is zippering the boundaries of charts within the image 350. Geometry image zippering helps maintain an original surface topology. To prevent cracks in a reconstructed mesh, a mesh processing tool analyzes boundary samples and "zippers" together discrete boundaries of charts that adjoin on the 3D surface.

Figure 13:
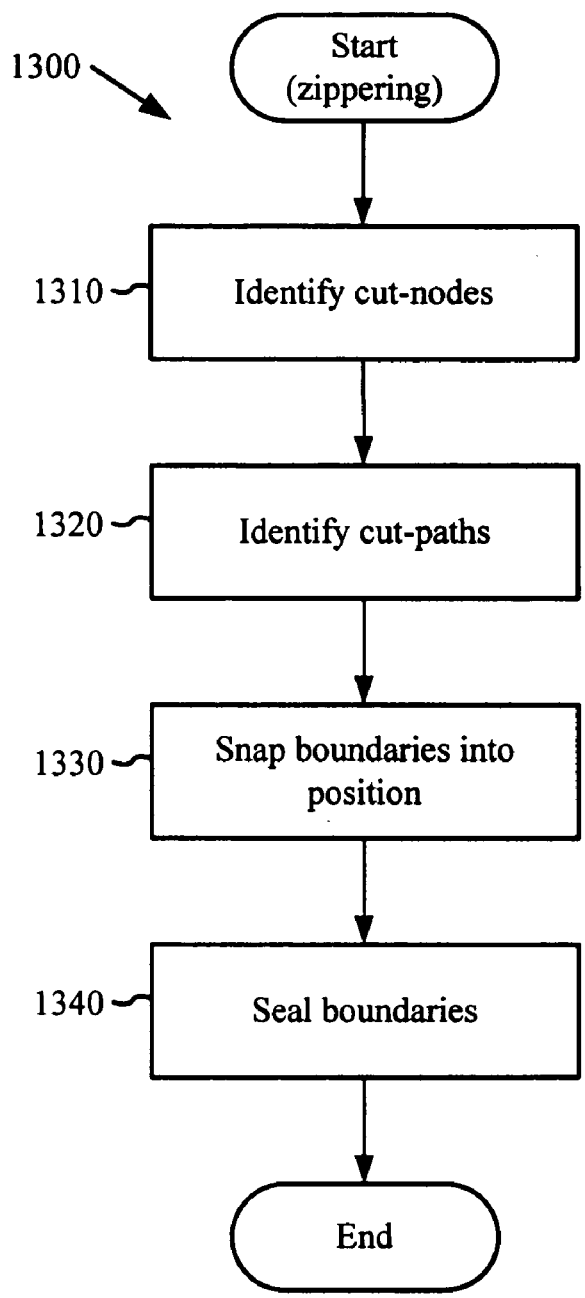
FIG. 13 is a flowchart of a technique for zippering to close gaps between charts.

FIG. 13 illustrates a technique 1300 for zippering along boundary samples. FIGS. 14A–D illustrate a discretized image and reconstruction at various stages of the zippering process. A tool such as the mesh processing tool 200 of FIG. 2 performs the technique 1300. Alternatively, another tool performs the technique 1300.

Figure 14A:
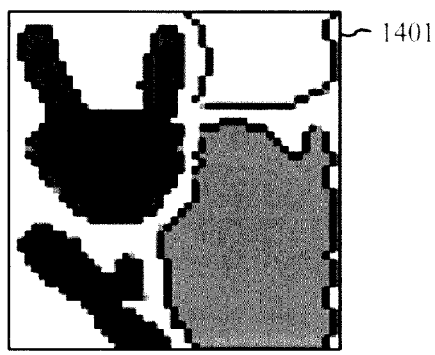
FIGS. 14A–D are color illustrations of a discretized images and a reconstruction at various stages of the zippering process.

First, the tool identifies cut-nodes 1310 in the mesh. A cut-node is a mesh vertex with more than two adjacent charts; in other words, it is a chart corner. For every chart adjacent to the chart corner, the cut-node is mapped to a unique cut-node sample in the image domain. So, for a given cut-node, different cut-node samples (for different charts) in the image have the same (x, y, z) position value. Also, different cut-node samples for a given chart have different (x, y, z) position values. FIG. 14A illustrates discretized charts 1401 in an image, with boundary samples in black and cut-node samples in pink. In one implementation, the closest boundary sample in terms of 3D distance from the cut-node is chosen as the cut-node sample. Alternatively, the tool uses additional and/or different criteria to identify cut-nodes or cut-node samples.

In addition, cut-node placement is constrained to preserve the clockwise-order of cut-paths (discussed below). In practice MCGIM resolution is typically large enough to map each cut-node to a distinct cut-node sample. If more than one cut-node sample does correspond to the same cut-node, the cut-node samples are all assigned the same 3D geometric position corresponding to the cut-node.

Figure 14B:
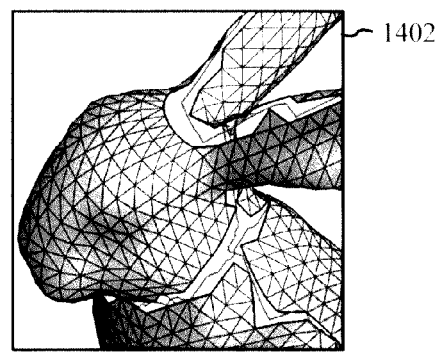

Next, the tool identifies cut-paths 1320. FIG. 14B illustrates surface cut-paths (in red lines) in a reconstruction 1402 of a rabbit mesh model, before zippering. A cut-path is formed by connecting cut-nodes. Cut-nodes form the end points of a set of edges that make up the cut-path or boundary between two adjacent charts. A continuous surface cut-path (e.g., a red line in FIG. 14B) in the mesh maps to two discrete cut-paths (i.e., two sets of boundary samples) in the image domain. Boundary samples along these pairs of discrete cut-paths will be unified toward the continuous cut-path.

Figure 14C:
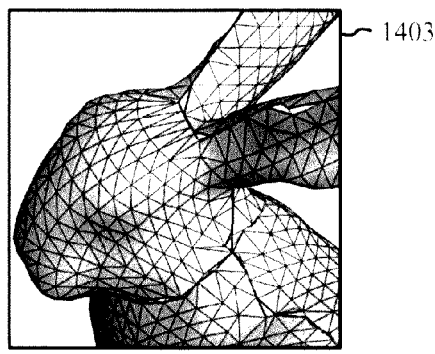

To unify the boundary samples in opposing pairs of discrete cut-paths, the tool snaps chart boundaries into position 1330. FIG. 14C illustrates boundary samples from two adjacent charts snapped together to the surface cut-paths in a reconstruction 1403. Each boundary sample in a discrete cut-path is snapped to the closest point along the continuous cut-path, overwriting the value of that boundary sample in the discrete cut-path with a new value. This narrows the gap between the charts. But the mesh may still not be watertight because of sampling differences, as shown in FIG. 14C. Two discrete cut-paths corresponding to the same continuous chart boundary generally contain different numbers of samples. If so, simple 1-to-1 unification along the two discrete cut-paths is insufficient to seal the mesh because more than two samples occasionally may need to be unified.

Figure 14D:
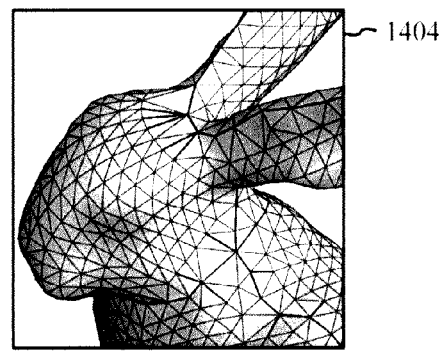

Thus, as necessary, the tool seals boundaries 1340 between adjacent charts. FIG. 14D illustrates boundary samples unified in a reconstruction 1404 to form a watertight mesh. To seal the boundaries completely, boundary samples are unified.

Figure 15A:
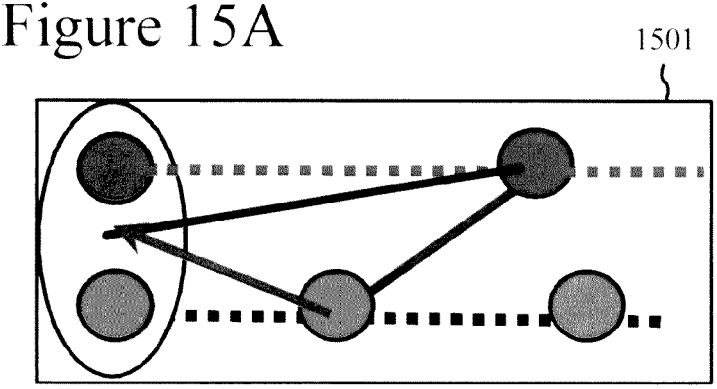
FIGS. 15A–C are color illustrations of boundary samples at different stages of a unification and clustering process.
Figure 15B:
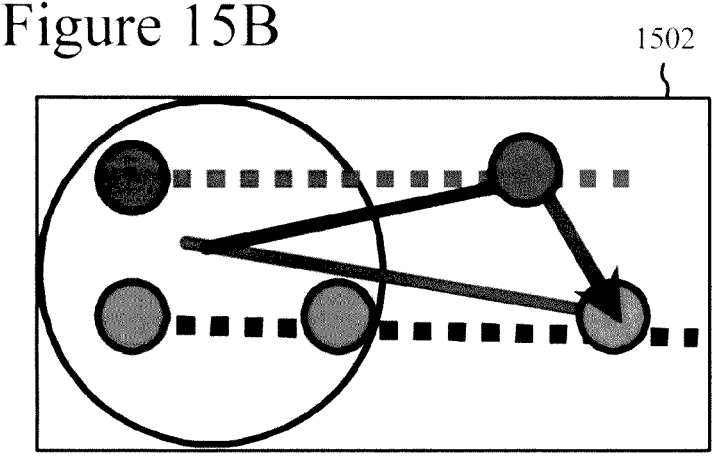
Figure 15C:
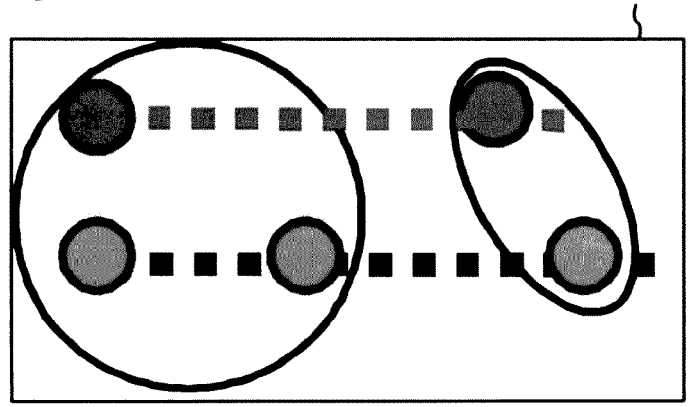

In one implementation, the tool performs a simple greedy algorithm to produce high quality zippering. The algorithm uses a one-pass, lock-step traversal of the two discrete cut-paths. FIGS. 15A–C show boundary samples of two discrete cut-paths at different stages of this traversal process. In FIGS. 15A–C, the green bubbles represent unified clusters of samples, and the dashed lines represent two discrete cut-paths, one in pink and one in blue, with boundary samples along the cut path.

With reference to FIG. 15A, the greedy algorithm follows the cut-paths and unifies boundary samples together. As illustrated, the tool has already snapped and unified two cut-node samples as described above (seen in the green bubble). As the traversal continues, the tool has several options about how to proceed. For example, it may advance along either of the discrete cut-paths individually, as illustrated by the green arrow. In FIG. 15B a newly visited sample along the blue cut-path is assigned to the geometric position of the current unified cluster. Notably, the greedy algorithm considers alternative alignments when clustering samples. For example, referring back to FIG. 15A, the tool may consider adding the second pink sample to the cluster (as shown by the green line), but in this case determines that adding the second pink sample alters the updated sample too much. Or, the second pink sample and the second blue sample may be clustered (as illustrated by the purple line). Using the greedy algorithm, the tool considers this cluster variation and selects it if it is the best one according to the algorithm. Several techniques for choosing the best cluster alignment may work efficiently. Here, the zippering tool chooses the alignment that alters the updated samples by the least amount.

Instead of advancing along either of the discrete cut-paths individually, the tool may advance along both paths concurrently. FIG. 15C illustrates the boundary samples with the tool advancing along both of the discrete cut-paths concurrently. A new cluster of samples (in the second green bubble) may be created by the snap and unify techniques described above. The cluster of samples is assigned the geometric position of one of the samples.

This process is repeated until all samples along the discrete cut-paths have been unified with at least one sample on the other cut-path. For different alternative unification decisions, the tool typically selects the zipper advancement that alters the updated sample by the least amount—a simple, greedy decision.

After unification, the mesh reconstructed from the discrete samples is watertight. FIG. 14D shows a close-up image of the unified cut-paths in the bunny reconstruction 1404.

Notably, in practice, when two adjacent boundary samples in the same discrete cut-path are unified together, their reconstruction forms a degenerate triangle, which is in fact just a line. These degenerate faces do not affect the manifold property of the mesh and can be removed during reconstruction or harmlessly rendered as is. Even with texture mapping, degenerate faces do not introduce artifacts, since the texture samples are unified just like the geometric ones.

Alternatively, a tool uses additional and/or different steps to zipper together boundary samples across gaps between discretized boundaries of adjacent charts, or works on charts other than charts in MCGIMs. For example, although the charts in an MCGIM are regular meshes (with irregular boundaries), the zippering techniques do not actually depend on the fact that the interior of a chart is regularly sampled. The zippering techniques might be applied to multiple charts in different images, which are collectively used in reconstruction of a given mesh surface.

F. Geometry Image Optimization

After creating a zippered, watertight MCGIM, the mesh processing tool performs mesh optimization 360 on the MCGIM. The MCGIM's defined samples may be optimized to improve geometric fidelity to the original mesh. In other words, the (x, y, z) position values at pixels of the MCGIM may be adjusted, for example, to more accurately represent sharp features such as creases and corners of the original object model. Moreover, image optimization may smooth and regularize the sample positions across the zippered chart boundaries.

For example, the mesh optimization technique described in the Hoppe article is extended to optimize the mesh. In the Hoppe approach, both the connectivity and vertex positions of the approximating mesh are optimized to fit the reference surface. The fit accuracy is measured by sampling a dense set of points from the reference surface and minimizing the squared distanced of those points from the approximating mesh. In this setting, the mesh connectivity is determined by the grid structure and the vertex positions. Each quad of the grid is split into two triangles along the shorter diagonal for the quad. Thus, only the vertex positions need to be optimized since the grid diagonals change as vertices are moved. Optimization occurs by using a non-linear conjugate-gradient solver (useful techniques for solving large-scale non-linear optimization problems), which converges to reasonably good optimization answers, even though the fit measure lacks continuity due to diagonal flipping. To keep the mesh from folding over during the fit, a mesh smoothness term is added to the energy function being minimized. This term is set to the $L^P$ norm of the dihedral angles of the mesh edges. In one implementation, setting p=4 produces good results. In other implementations, the setting may be higher or lower than 4.

FIGS. 16A and 16B show examples of reconstructions from MCGIM models before and after optimization, with sharp features that are improved using geometry image optimization. FIG. 16A shows views 1601 and 1602 of reconstructions from two MCGIMs before mesh optimizations. FIG. 16B shows views 1611 and 1612 of reconstructions after mesh optimizations on the MCGIMs.

Alternatively, the tool performs additional and/or different mesh optimization techniques.

IV. Rendering

In some embodiments, a tool such as a rendering tool accepts a MCGIM and processes it for rendering, handling undefined samples in the MCGIM during the reconstruction process. Based upon the MCGIM, the rendering tool reconstructs part or all of a mesh for viewing from a given perspective, distance, etc.

As described above, a MCGIM is a 2D array of samples that have values for 3D points from a mesh. The charts packed into the MCGIM are made up of defined samples, and the charts are separated by undefined samples. The undefined samples are indicated by special invalid values in the geometry image, by a separate bit mask indicating defined/undefined status for the samples of the geometry image, or in some other manner.

In order to reconstruct all or part of the mesh surface from the MCGIM, the rendering tool traverses all or part of the samples of the MCGIM. For example, the rendering tool traverses the geometry image with a chart-by-chart, raster scan, or other scan pattern. The regular sampling pattern for charts in the MCGIM simplifies rendering inasmuch as memory access patterns for information such as vertices are more predictable, avoiding many memory indirections.

The rendering tool forms polygons such as triangles from the data in the MCGIM using reconstruction rules. For example, the rendering tool evaluates 2 by 2 groups of samples in the MCGIM. If fewer than three of the four samples have defined values, no triangle is formed. (Such samples typically represent a point or line that is part of another triangle and may be ignored during reconstruction.) If three of the four samples have defined values, the tool forms one triangle. If all four samples have defined values, the tool forms two triangles separated by a diagonal chosen from the two possible diagonals according to some criterion. In one implementation, the criterion is shorter 3D distance for the two possible diagonals. Alternatively, the tool uses additional and/or different rules or criteria for forming triangles or other polygons during rendering from a MCGIM.

In alternative embodiments, a tool uses additional and/or different steps in rendering, or works with charts other than charts in MCGIMs. For example, although charts in an MCGIM are separated by undefined samples, the rendering described above could be applied to other sets of multiple charts (e.g., in different images) that have undefined samples for padding to regular image sizes, boundary shape preservation, etc.

V. Overall Results

A completely automatic pipeline has been run on a large number of models. As a practical matter, the process takes approximately 1–2 hours per model on the systems used. To give some idea of the relative computational complexity of the different tasks, if chartification takes no more than X minutes, parameterization no more than 3 times X minutes, sampling and zippering less than ⅓ times X minutes, and mesh optimization about 2 times X minutes. X varies according to the type of system being used, for example on an exemplary test systems, as disclosed herein, X was 5. Alternative systems may produce different results. The remainder of the time (6 times X to 18 times X) is needed for the discrete optimization used for packing. Other packing schemes may yield better results.

Two cost metrics to compare MCGIMs with other approaches are memory cost and rendering cost, which may be defined as follows. Memory cost is the total number of samples in the domain grid (i.e., domain rectangle area). Rendering cost is the number of samples that must be processed (i.e., defined samples). In the following cost metrics equation, packing efficiency is the ratio of defined samples to total number of samples. Thus, rendering cost=memory cost*packing efficiency.

A measure of geometric accuracy is Peak Signal to Noise Ratio PSNR=20 $\log_{10}$(peak/d), where peak is the bounding box diagonal and d is the symmetric rms Hausdorff error (geometric distance) between the original mesh and the approximation. Similarly, the PSNR is measured for a normal signal derived from the geometry. A large normal error suggests parameterization artifacts like anisotropy.

A. Geometry Image Comparison

MCGIMs were created for a variety of models and compared them with GIMs according to the Gu article. To produce a fair comparison between single-chart and multi-chart geometry images, geometry image optimization was also applied to the prior GIM results.

As shown in FIG. 17, a significantly better PSNR result is obtained by using MCGIMs for the models in FIGS. 18A–18D. For the same memory cost (including storage cost for undefined samples), the geometry PSNR for the MCGIMs for the horse and feline meshes was more than 10 dB higher than with GIMs. To make a comparison for equivalent rendering cost, new MCGIMs were created with the same number of defined vertices as in the respective GIMs. The additional samples yield a further improvement of about 2 dB. For the Buddha model of FIG. 1A, the optimized GIM has a PSNR of 65.5 dB, whereas the equivalent-memory-cost MCGIM has a PSNR of 71.7 dB.

Figure 18A:
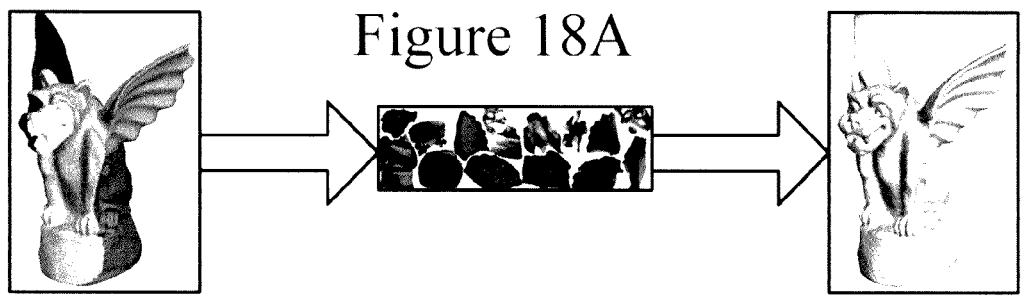
FIGS. 18A–D are color illustrations of chartified meshes, multi-chart geometry images, and reconstructions for various models.
Figure 18B:
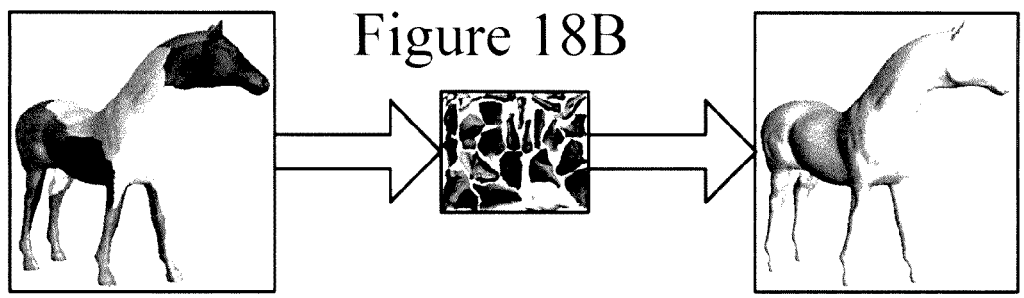
Figure 19:
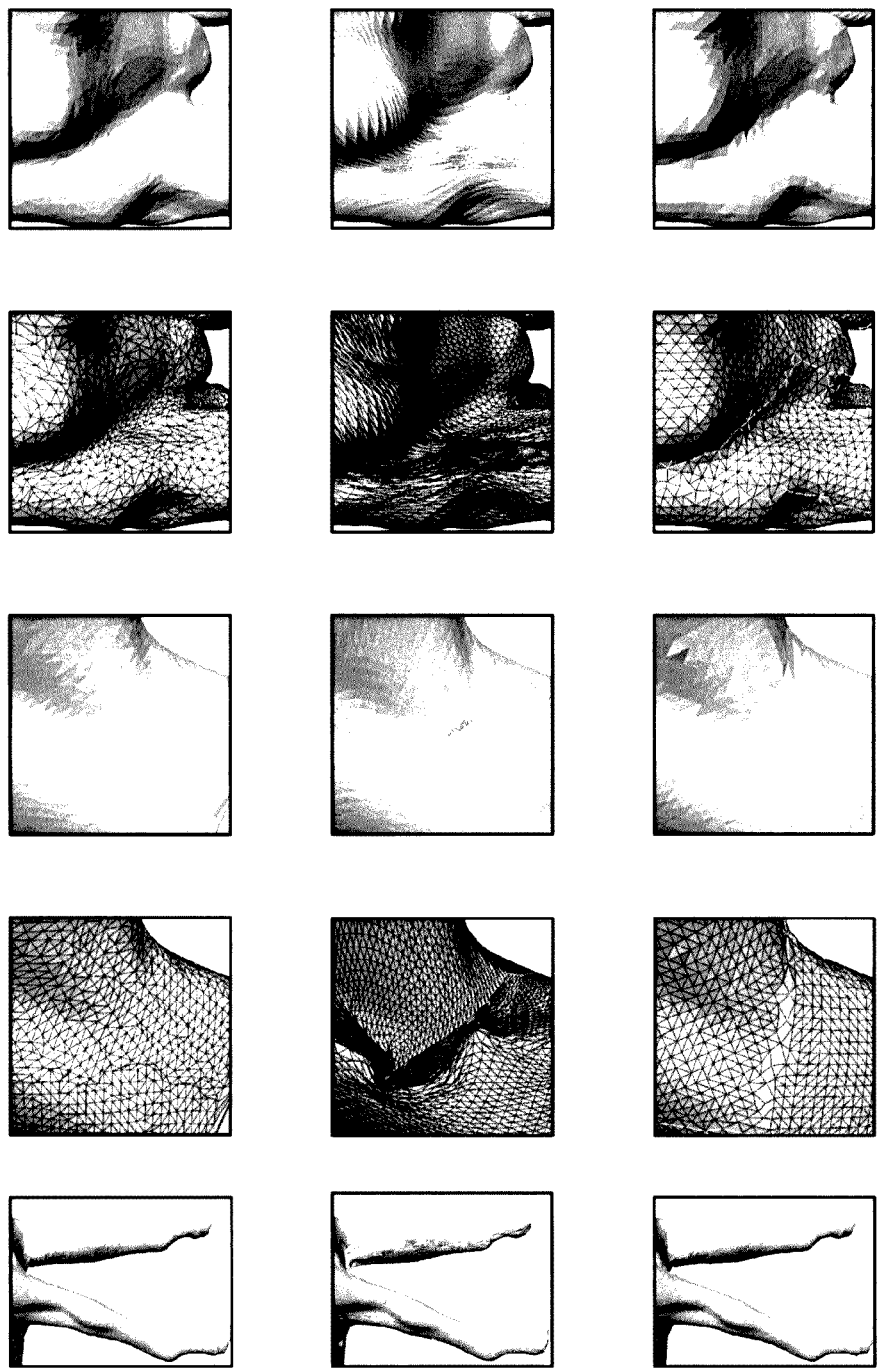
FIG. 19 is a set of color illustrations showing close up views of the model and reconstruction of FIG. 18B.

FIG. 19 shows close up views of the model and reconstruction of FIG. 18B. The top row is several close up views of the original mesh, the middle row is several close up views of the reconstruction from a GIM, and the bottom row is several close up views of the reconstruction from a MCGIM.

Figure 20:
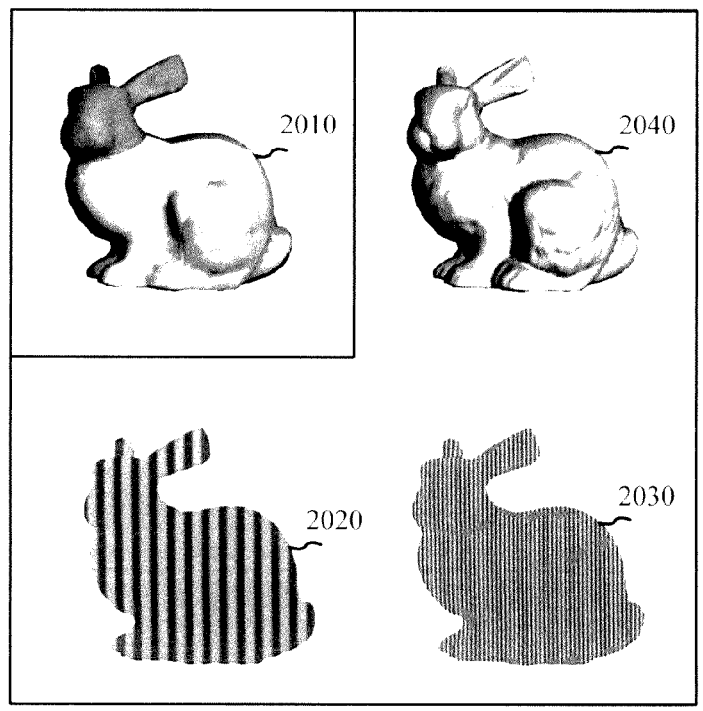
FIG. 20 is a set of color illustrations showing three different texture mappings for a reconstruction from a multi-chart geometry image.

FIG. 20 shows three different texture mappings using the implicit MCGIM parameterization. FIG. 20 shows a MCGIM model 2010 to be texture-mapped with three images 2020, 2030, and 2040. The image 2040 is the same coarse mesh, normal-mapped. The images 2020 and 2030 are texture-mapped using a sampled, projected stripe texture at medium frequency and near Nyquist rate, respectively. Texture coordinates are implicit, and each triangle in the model is exactly associated with 9×9/2 texture samples. The resulting renderings are nearly seamless. One potential problem, however, is that some zippered triangles are longer than interior ones, resulting in local undersampling of the textures onto those longer, zippered triangles.

Figure 21:
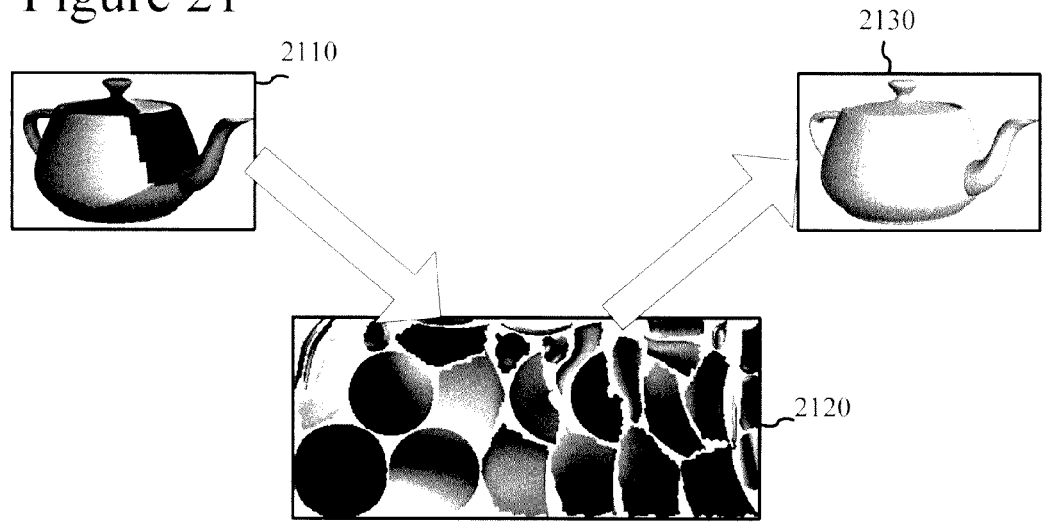
FIG. 21 is a set of color illustrations of a chartified mesh, multi-chart geometry image, and reconstruction for a model with several connected components.

Unlike GIMs, MCGIMs can also effectively represent meshes with multiple components. FIG. 21 shows a chartified mesh, MCGIM, and reconstruction for a teapot mesh. The teapot object has four components: lid, spout, handle, and body. The chartified mesh 2110 has 30 charts. The resulting chartification and packing in the MCGIM 2120 are excellent (81.3%), and the reconstructed mesh 2130 is produced with excellent results (PSNR=86.2 dB).

B. Semi-Regular Remeshing Comparison

Figure 22A:
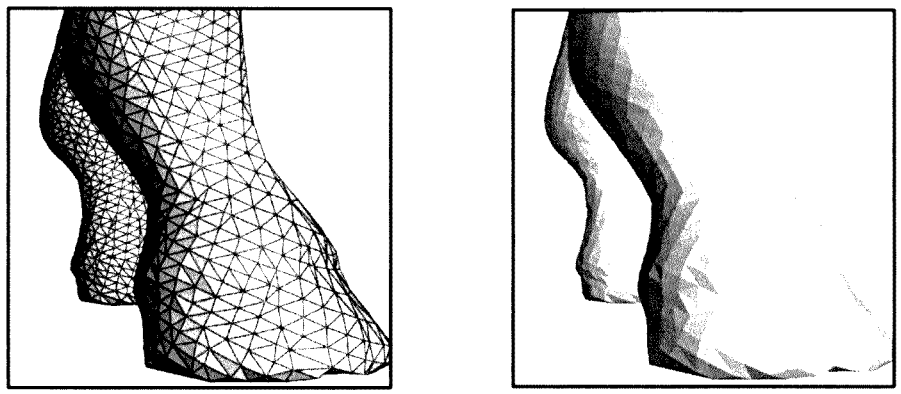
FIGS. 22A–22C are color illustrations showing close up views of an original irregular mesh, a reconstruction after semi-regular remeshing, and a reconstruction from a MCGIM.
Figure 22B:
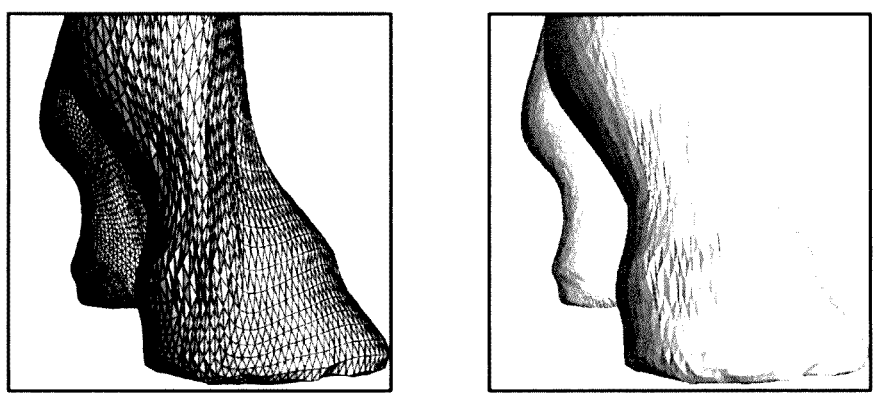
Figure 22C:
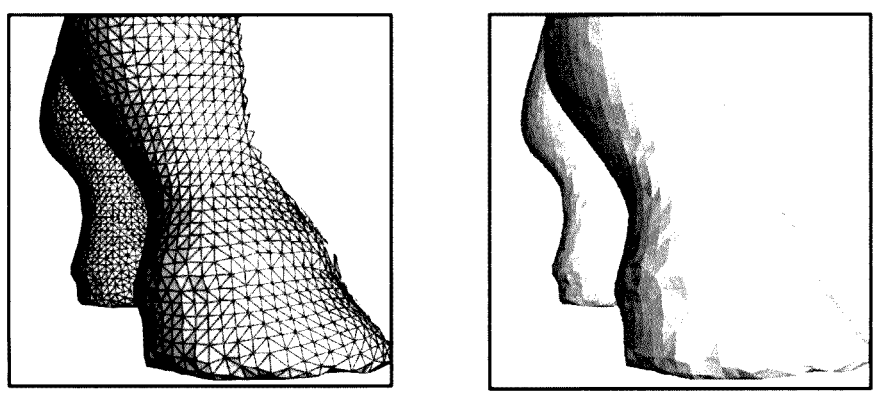
Figure 1C:
Figure 1B:
Figure 1A:
Figure 4A:
Figure 4B:
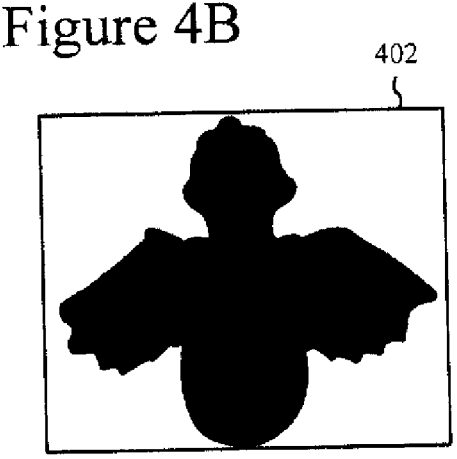
Figure 6A:
Figure 6B:
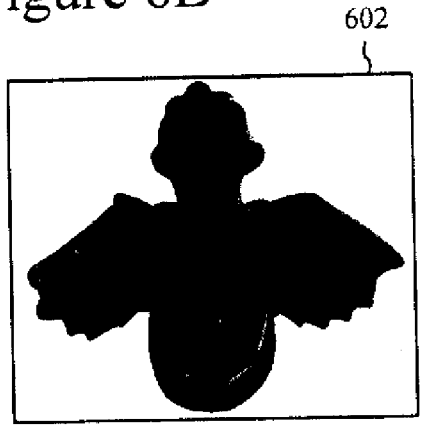
Figure 7A:
Figure 7B:
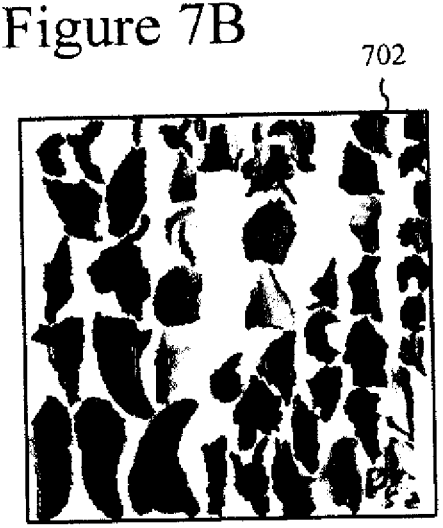
Figure 7C:
Figure 9:
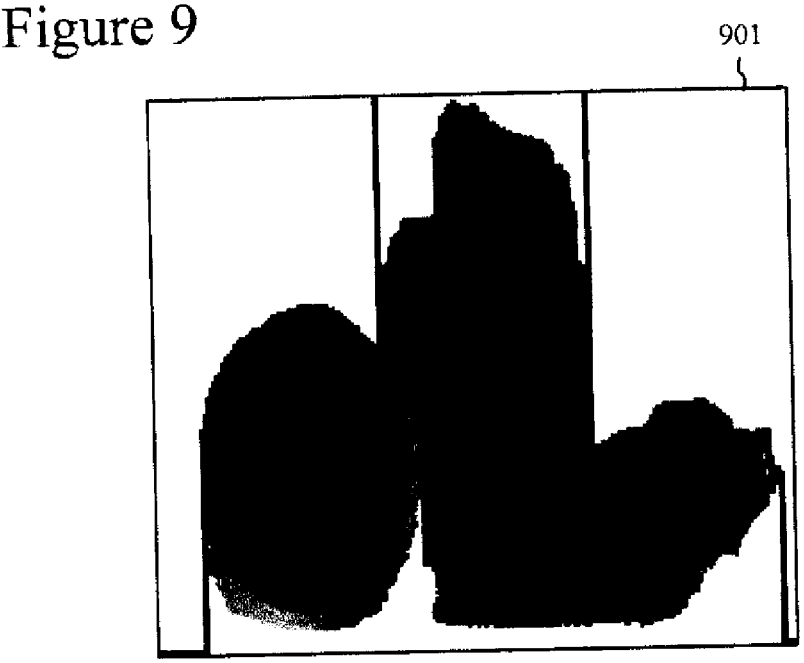
Figure 10A:
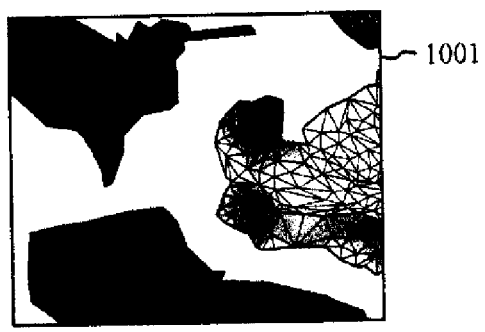
Figure 10B:
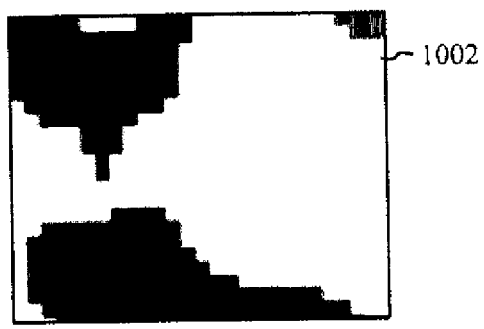
Figure 11A:
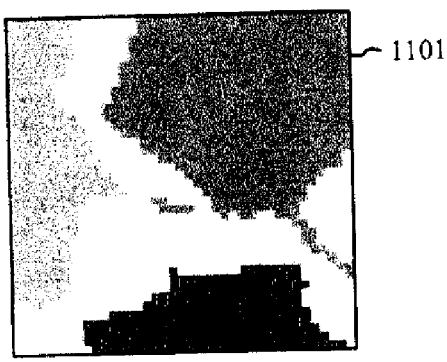
Figure 11B:
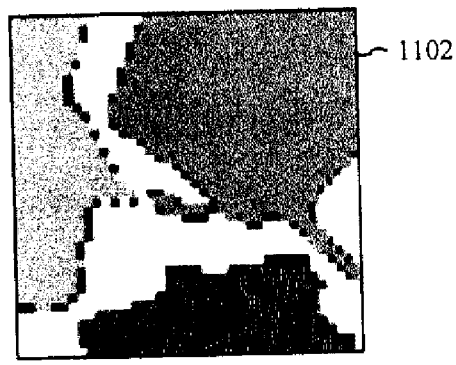
Figure 12A:
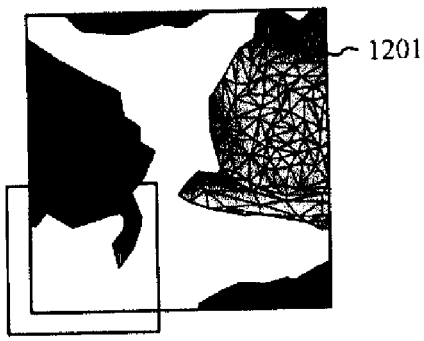
Figure 12B:
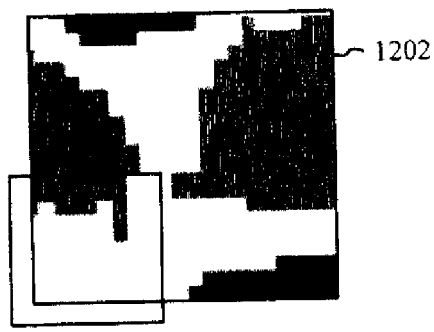
Figure 12C:
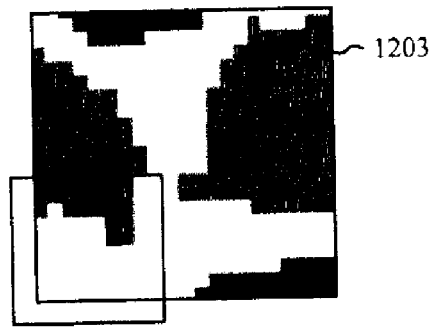
Figure 14A:
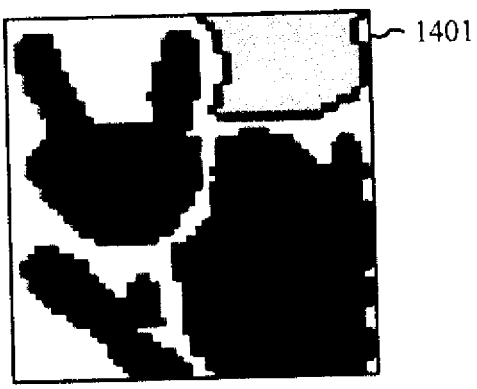
Figure 14B:
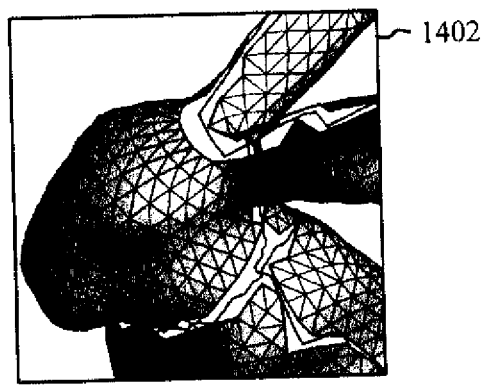
Figure 14C:
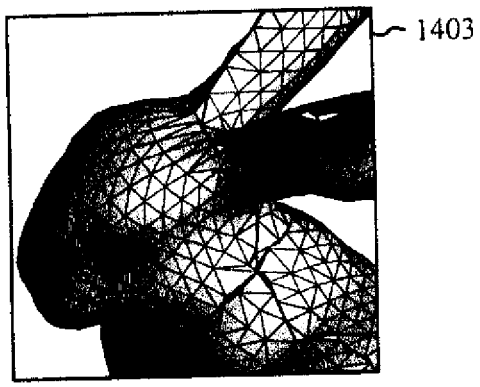
Figure 14D:
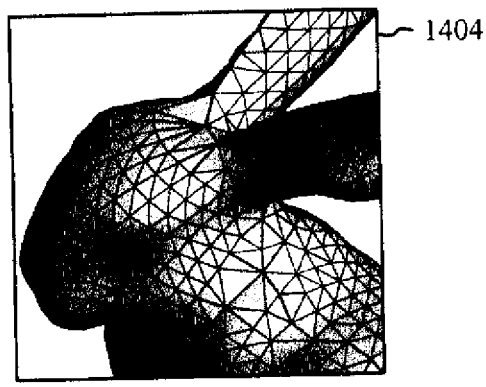
Figure 15A:
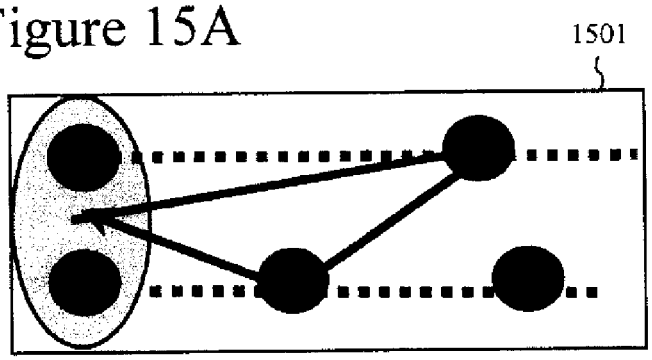
Figure 15B:
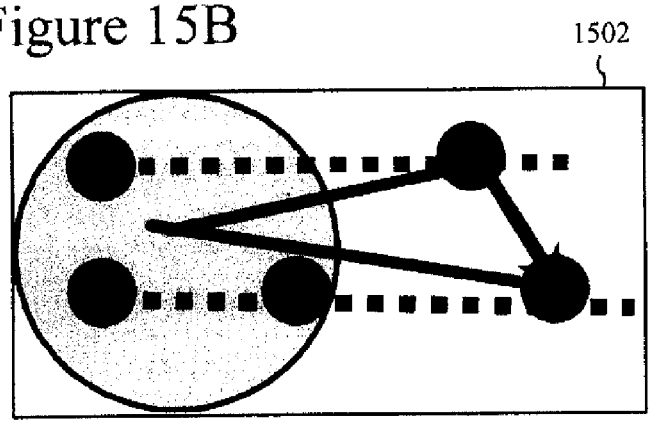
Figure 15C:
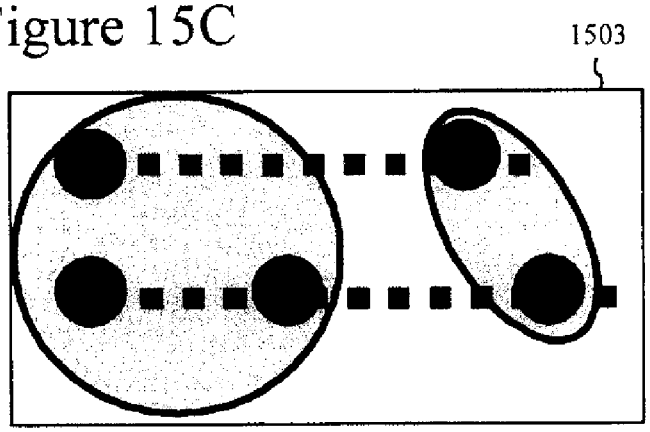
Figure 18A:
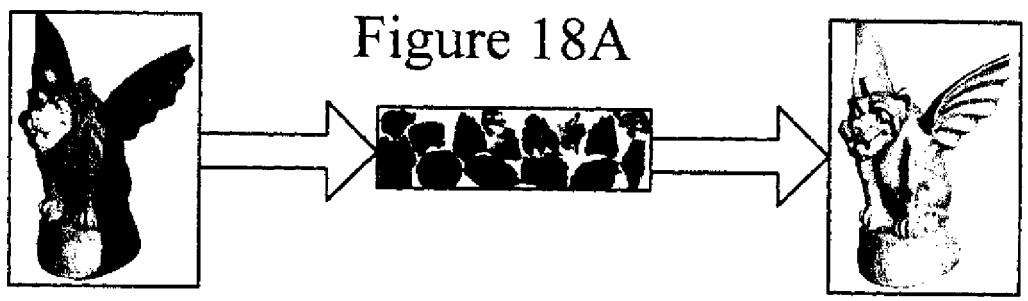
Figure 18B:
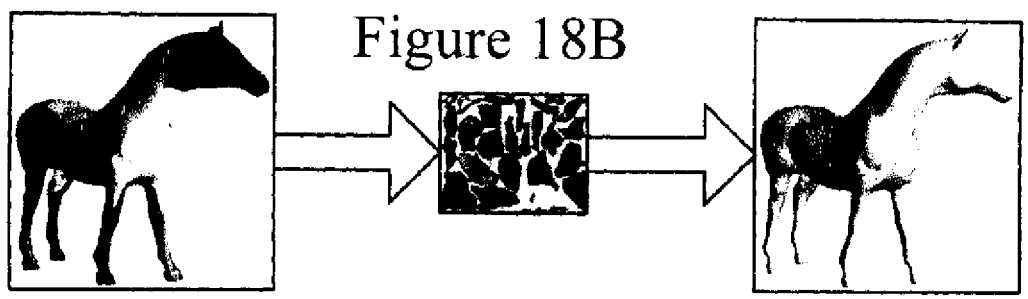
Figure 18C:
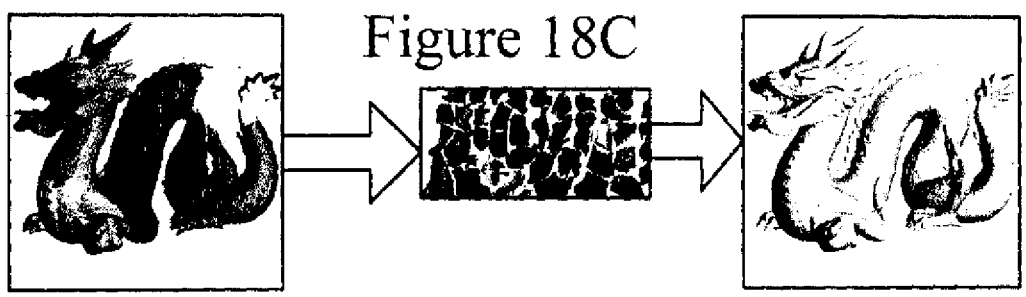
Figure 18D:
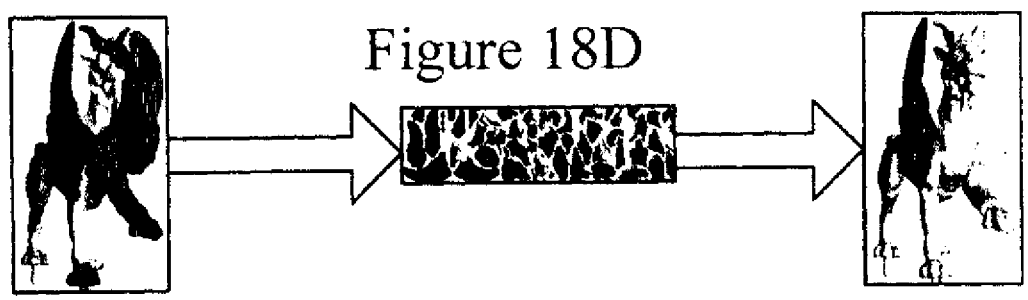
Figure 19:
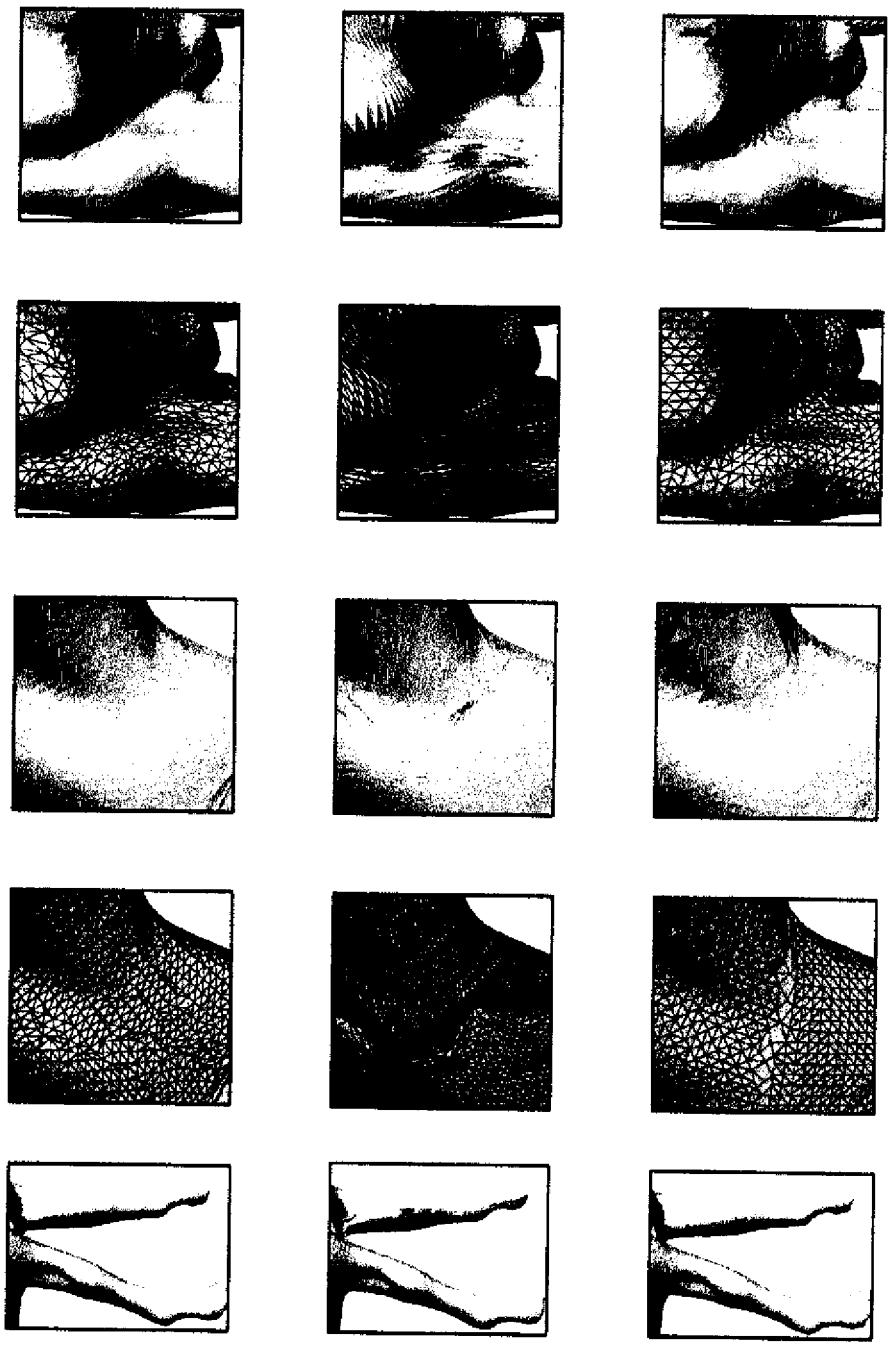
Figure 20:
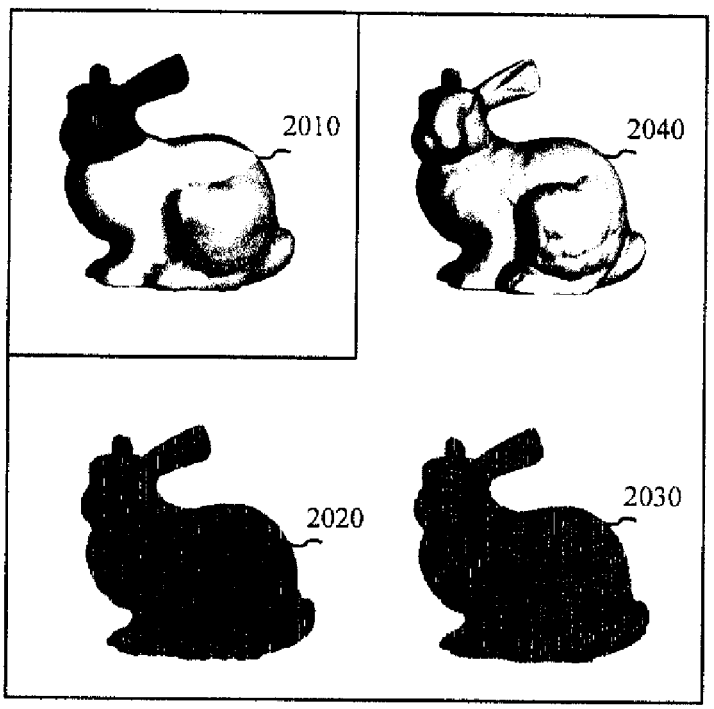
Figure 21:
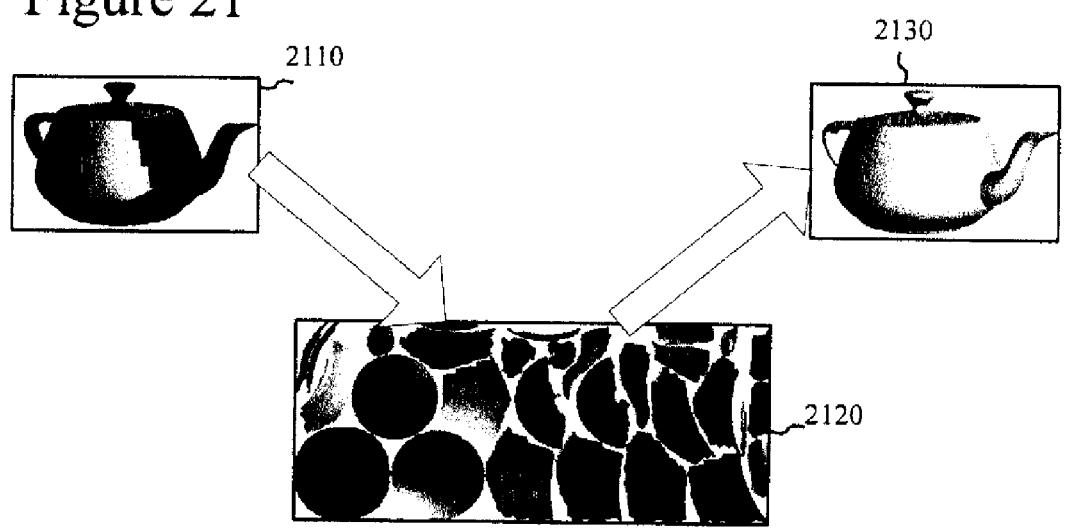
Figure 22A:
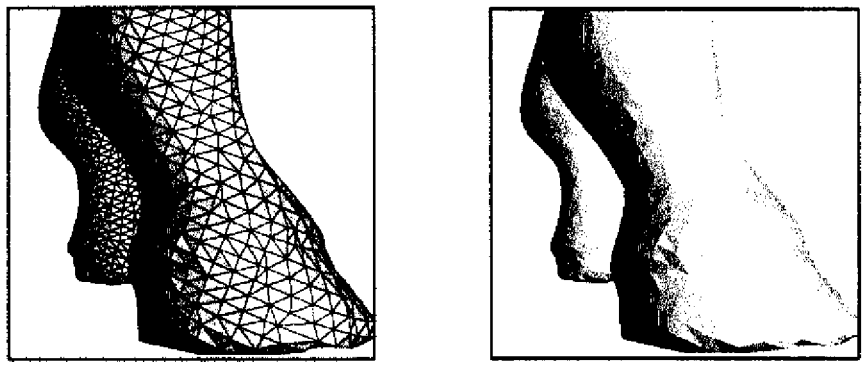
Figure 22B:
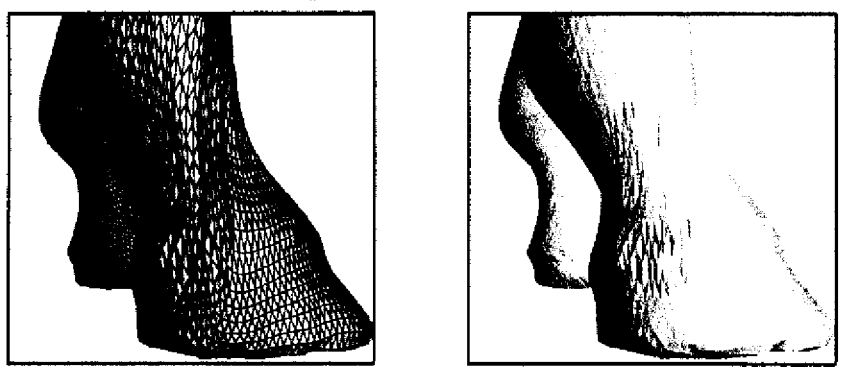
Figure 22C:
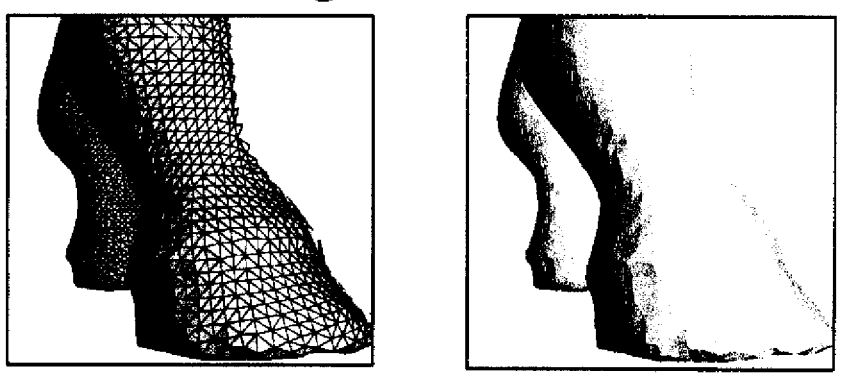
Figure 1C:
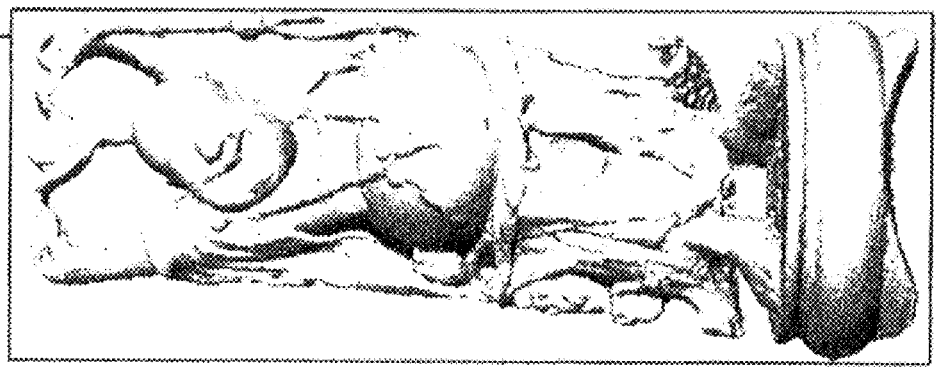
Figure 1B:
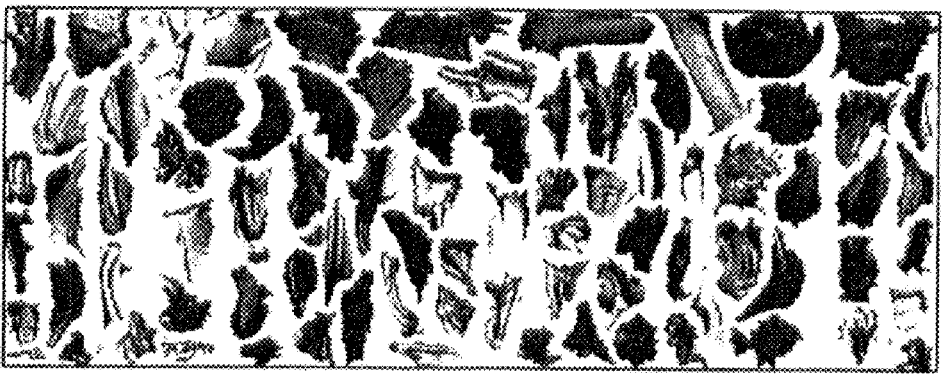
Figure 1A:
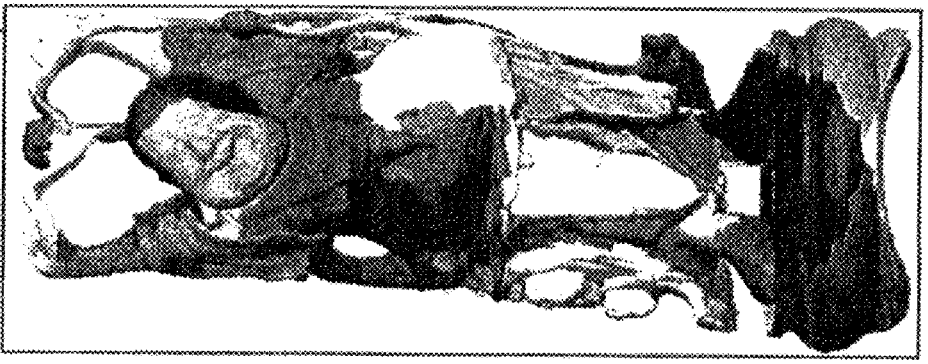
Figure 2:
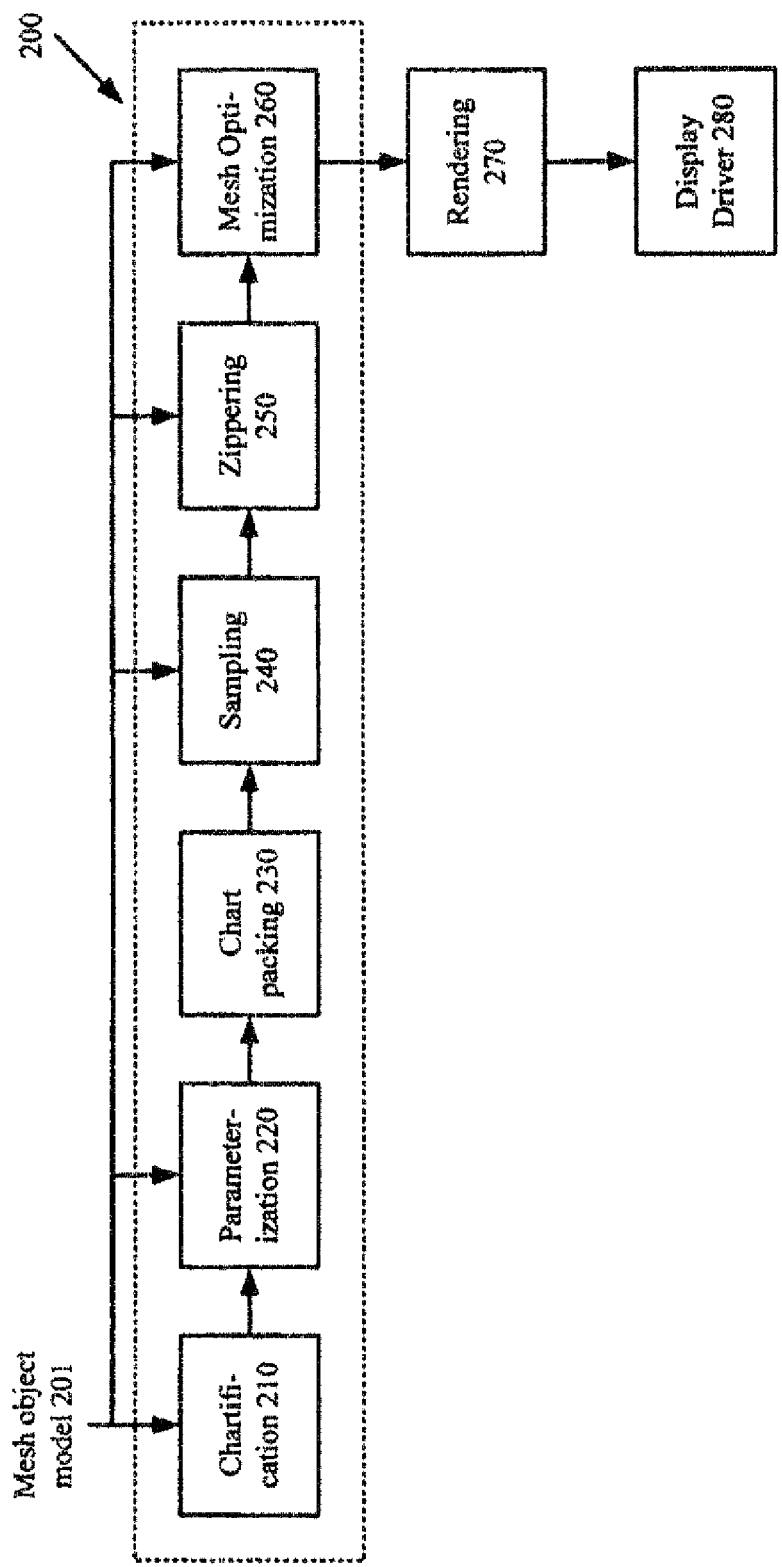
Figure 3:
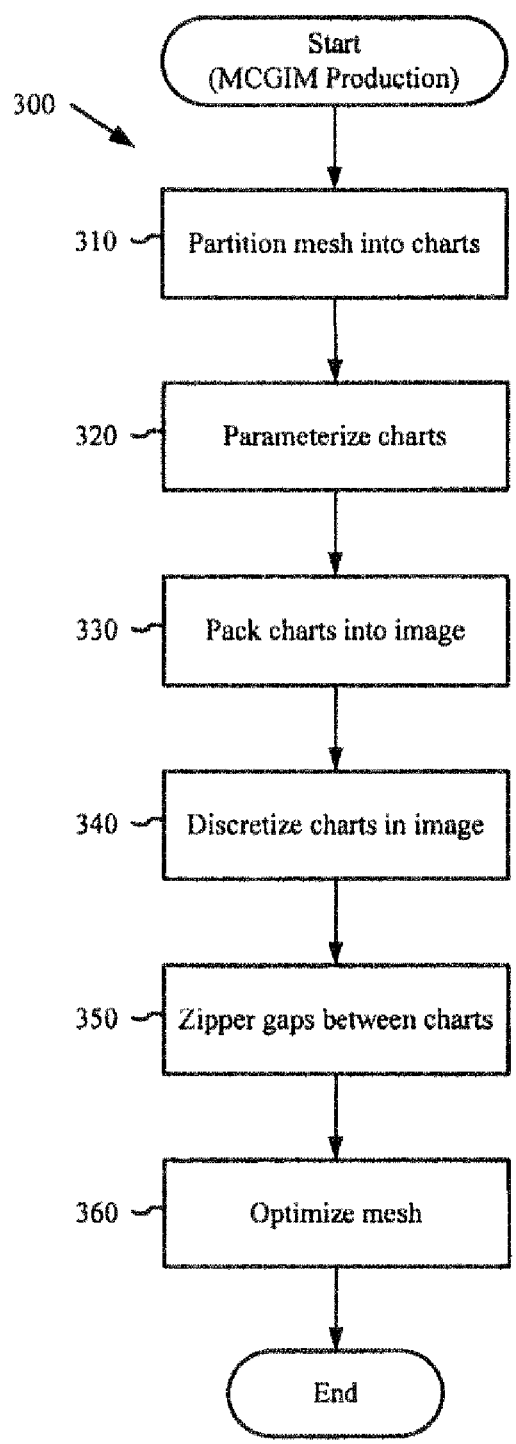
Figure 4A:
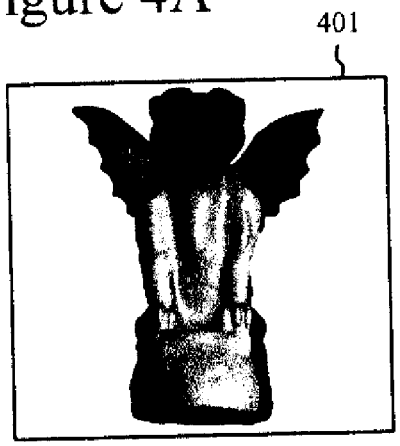
Figure 4B:
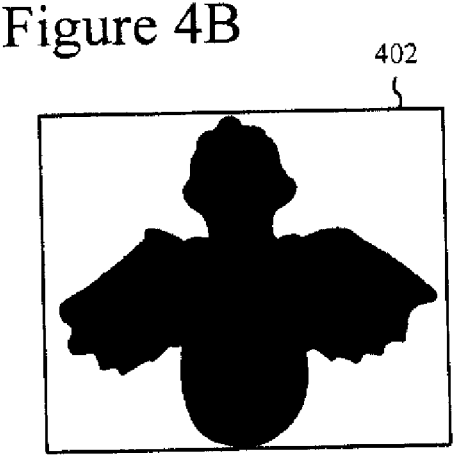
Figure 6A:
Figure 6B:
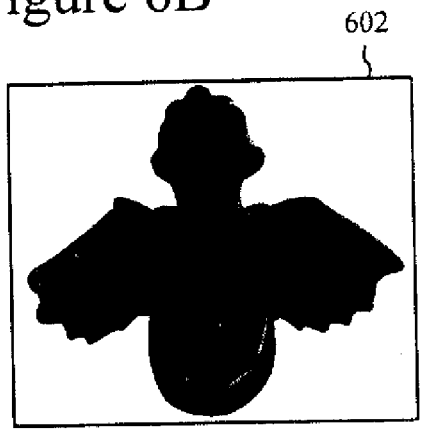
Figure 5:
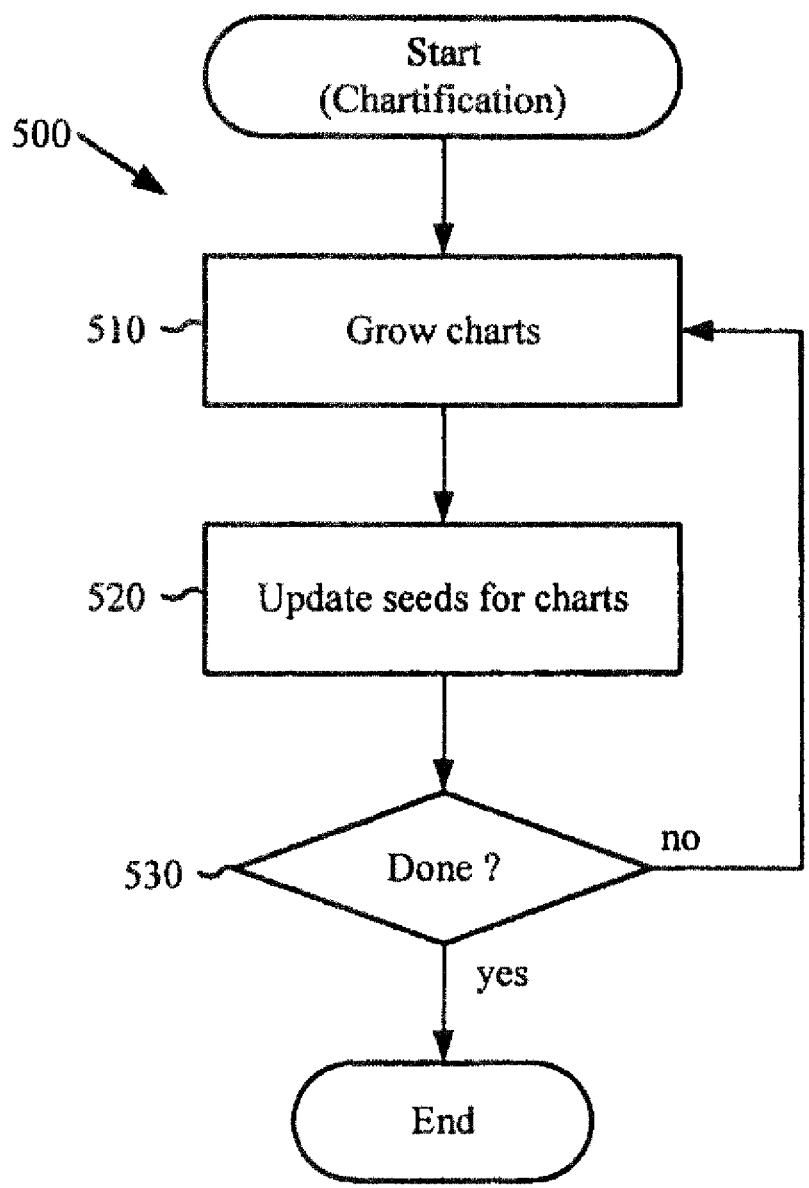
Figure 7A:
Figure 7B:
Figure 7C:
Figure 8:
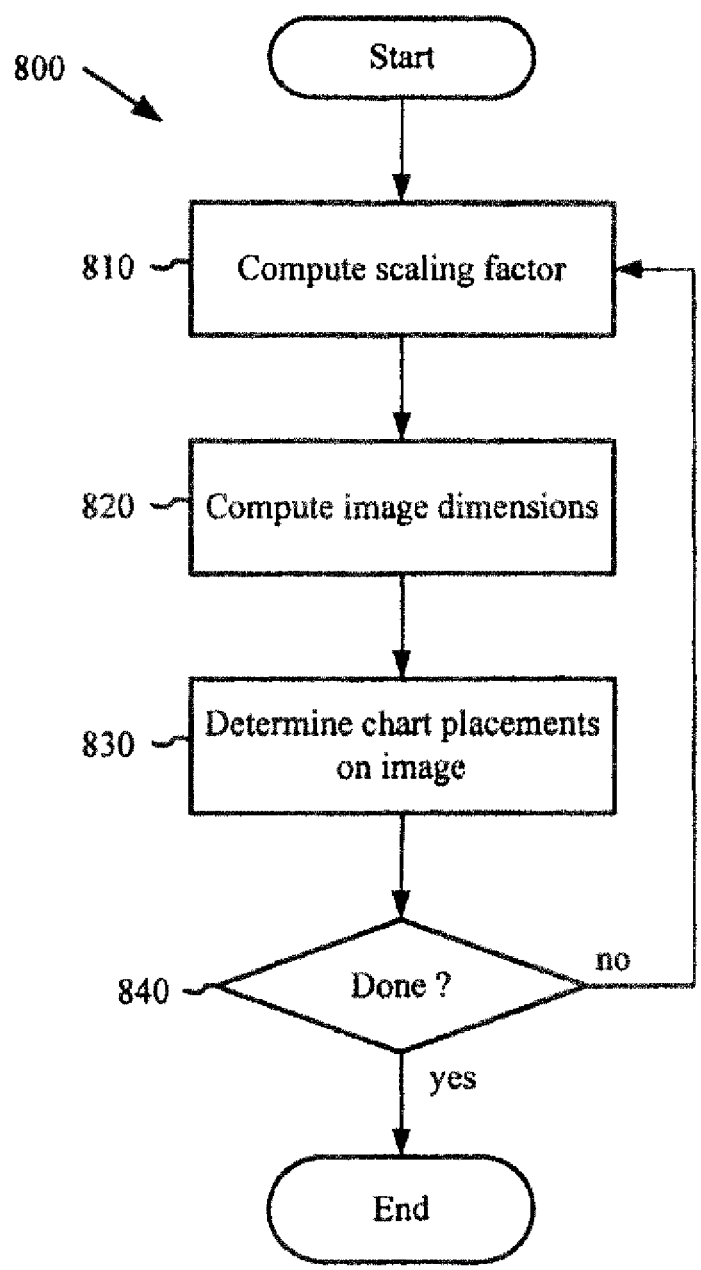
Figure 9:
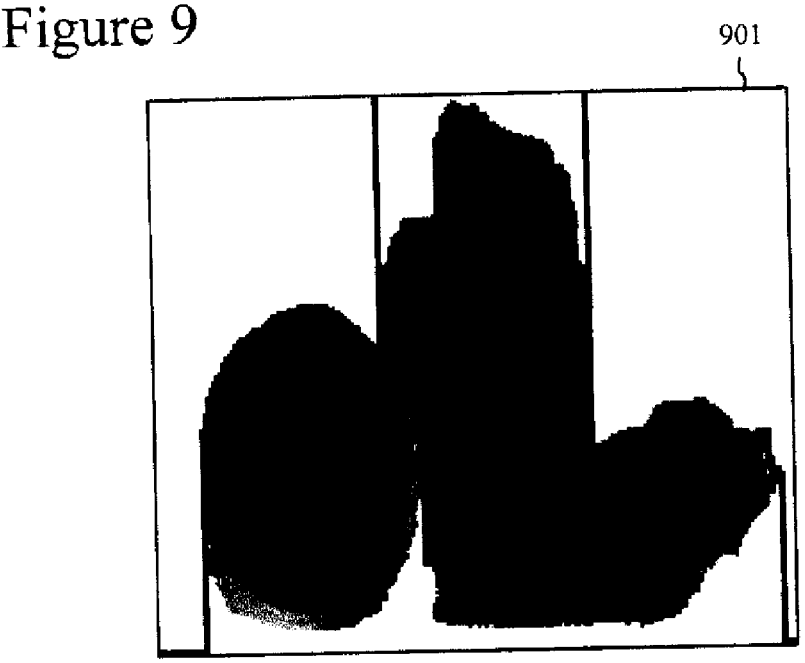
Figure 10A:
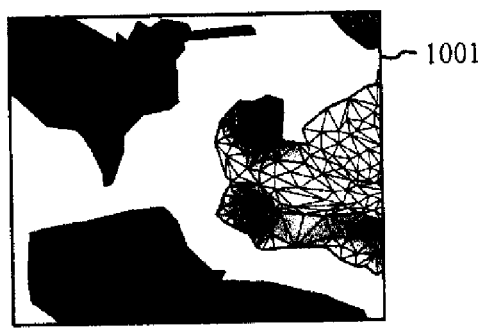
Figure 10B:
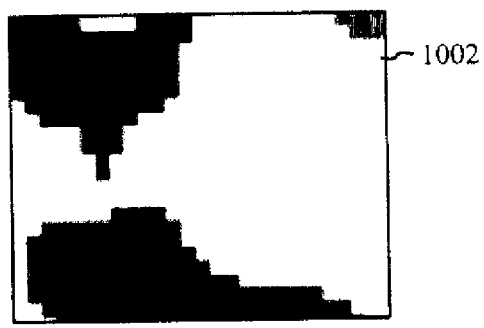
Figure 11A:
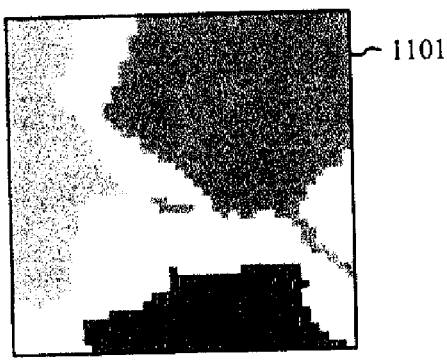
Figure 11B:
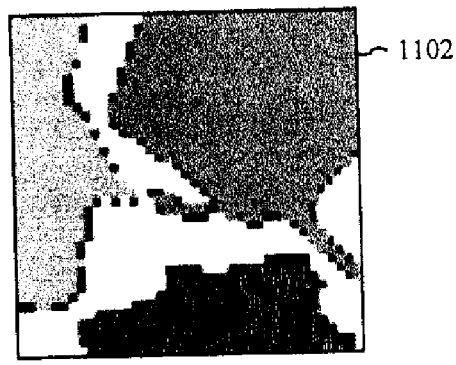
Figure 12A:
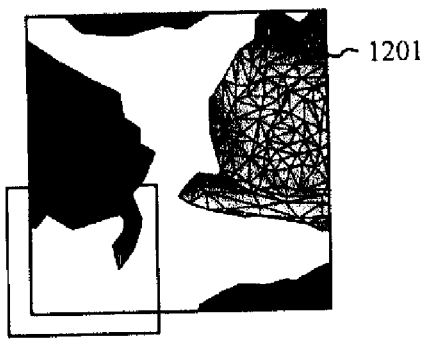
Figure 12B:
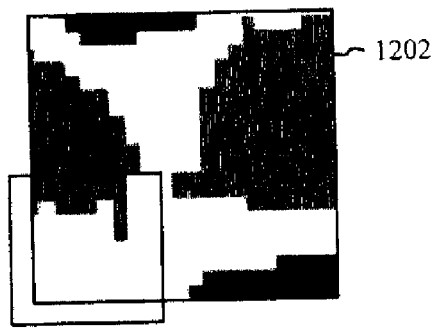
Figure 12C:
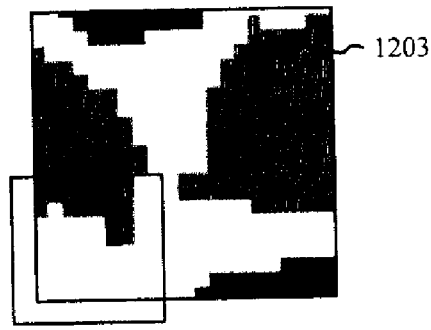
Figure 13:
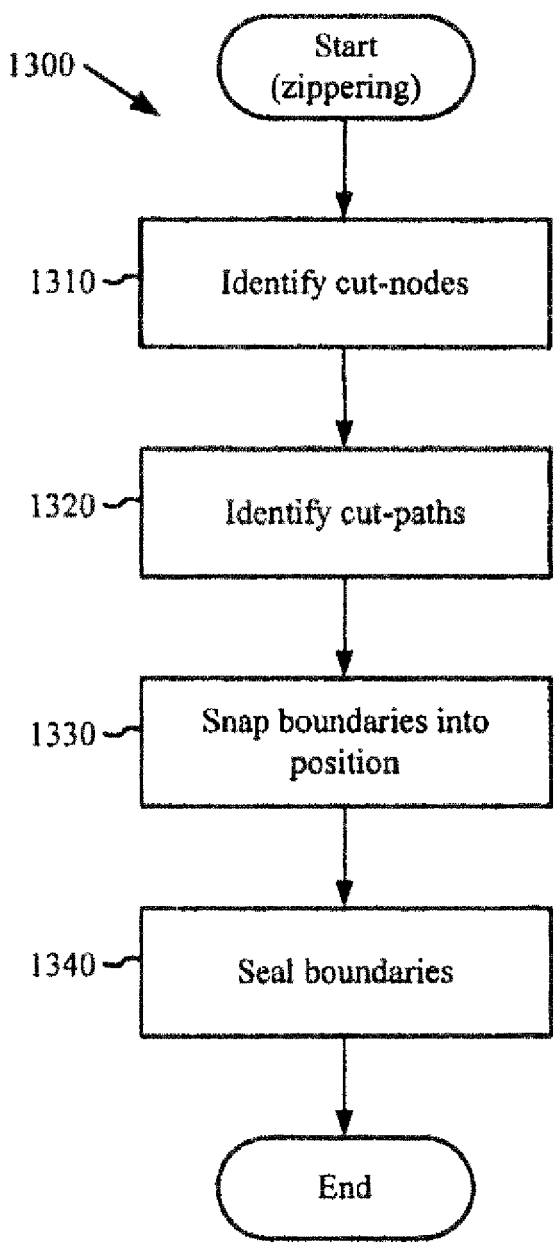
Figure 14A:
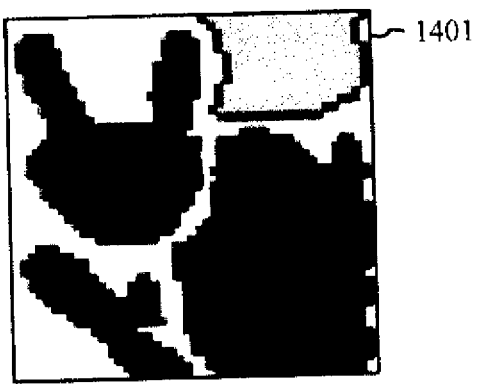
Figure 14B:
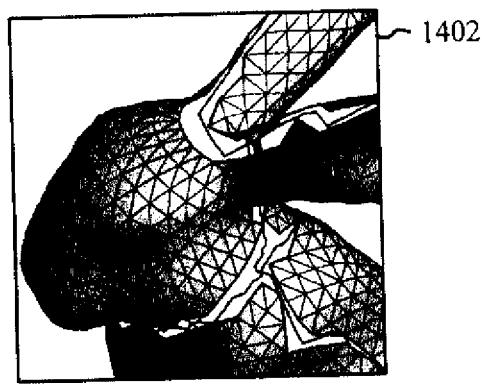
Figure 14C:
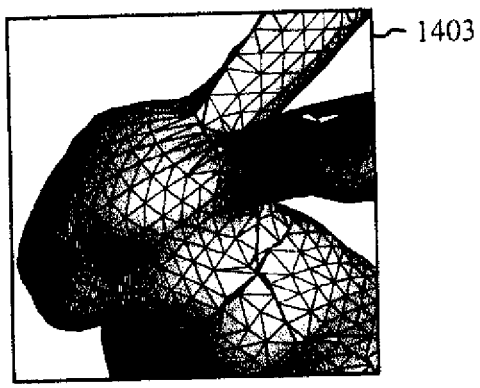
Figure 14D:
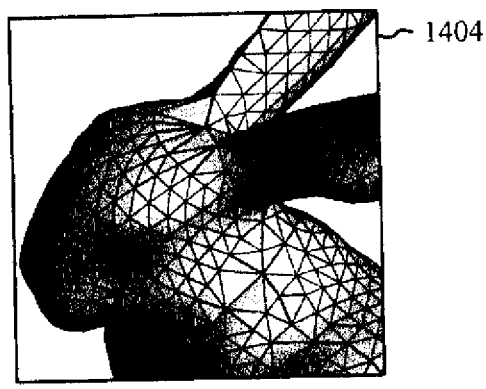
Figure 15A:
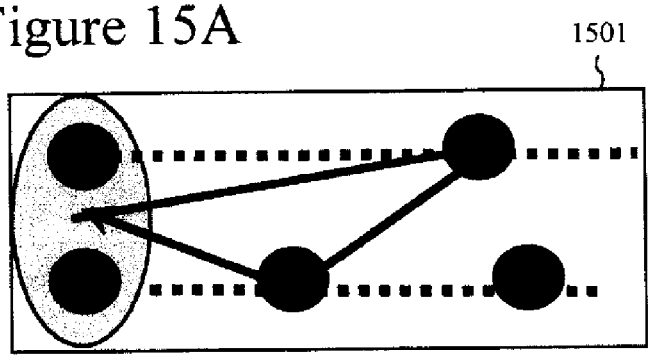
Figure 15B:
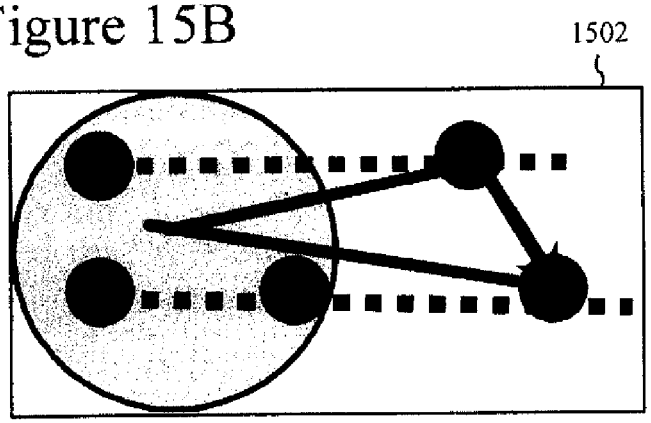
Figure 15C:
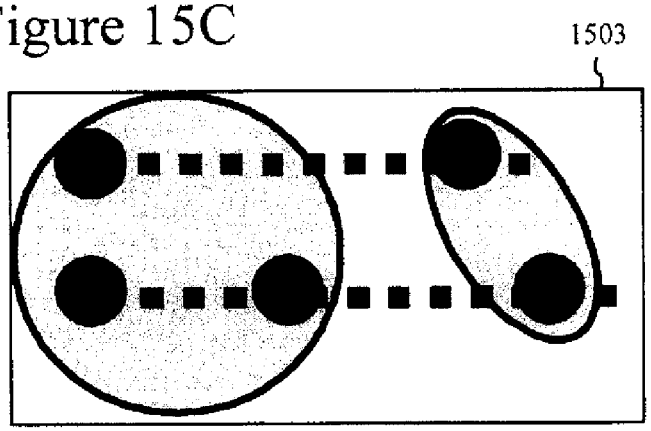
Figure 19:
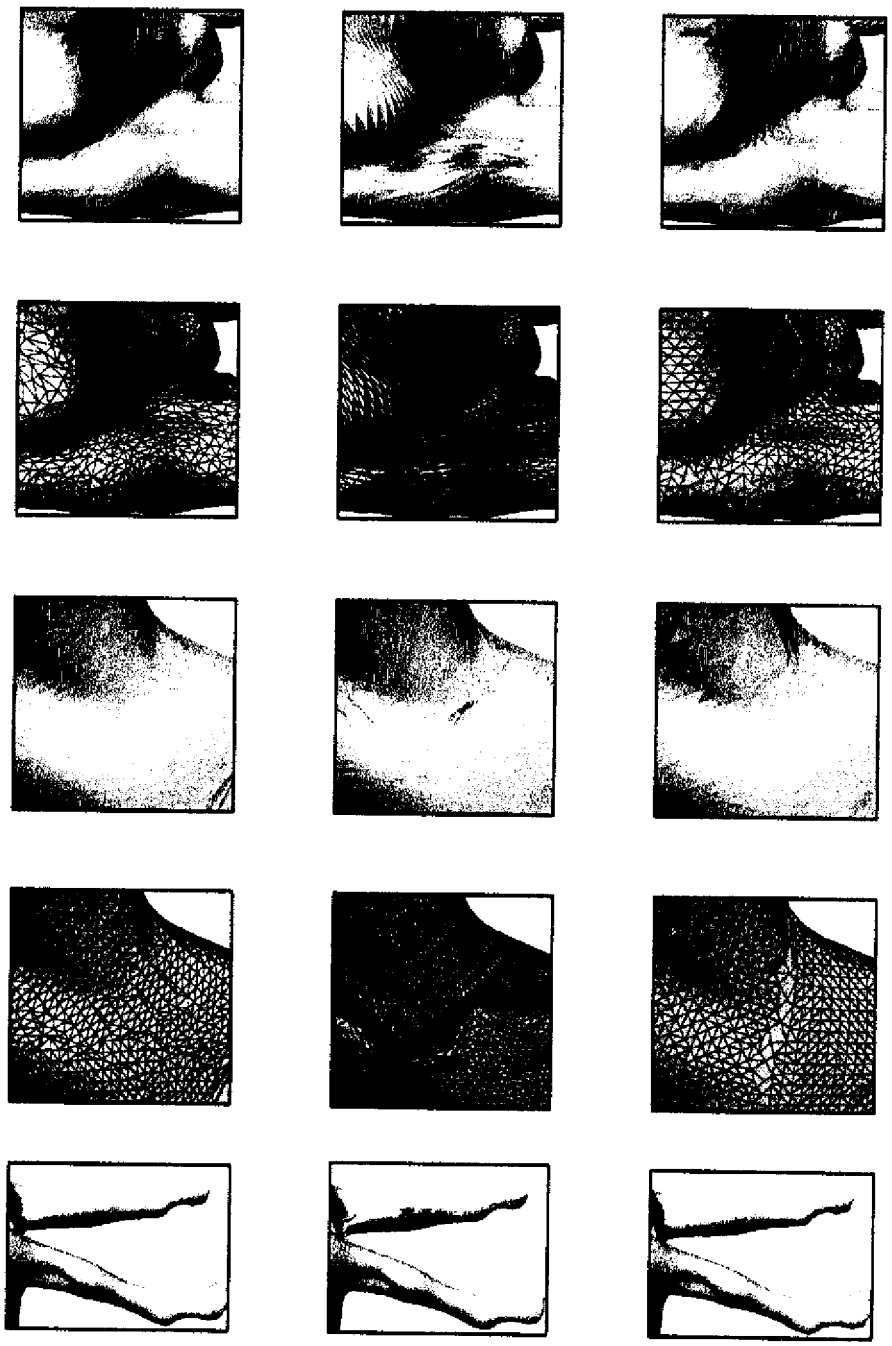
Figure 20:
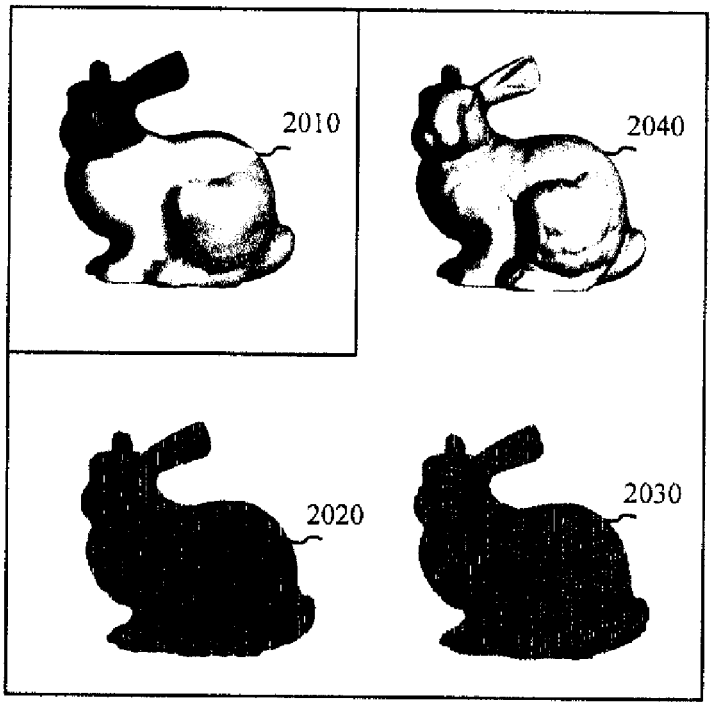
Figure 21:
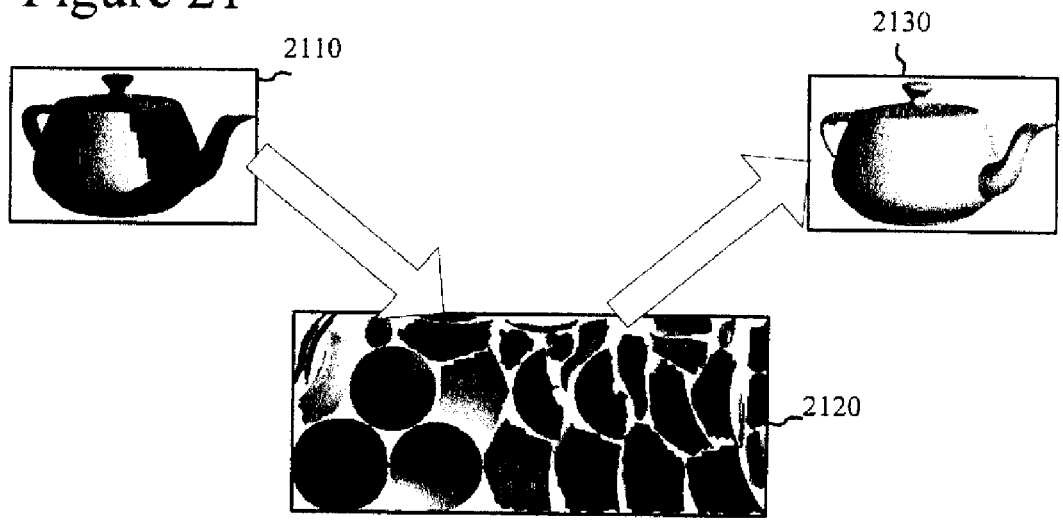
Figure 22A:
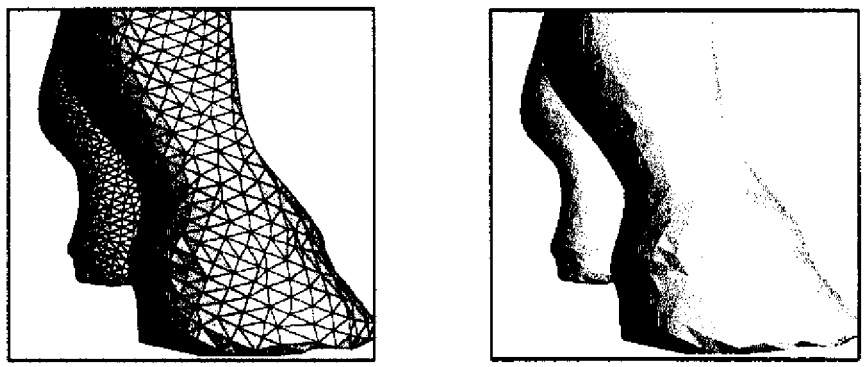
Figure 22B:
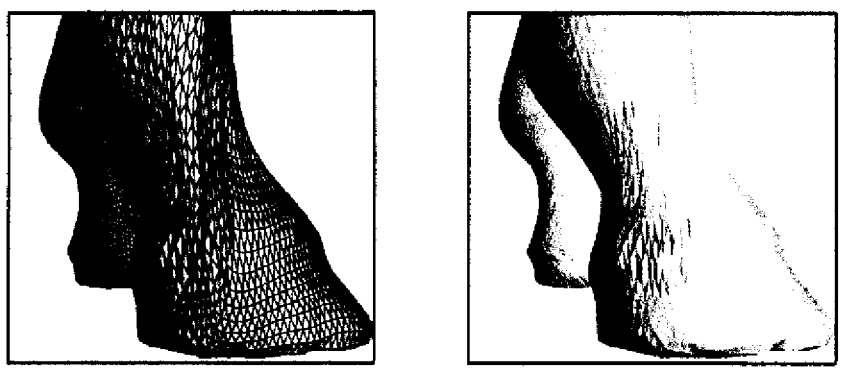
Figure 22C:
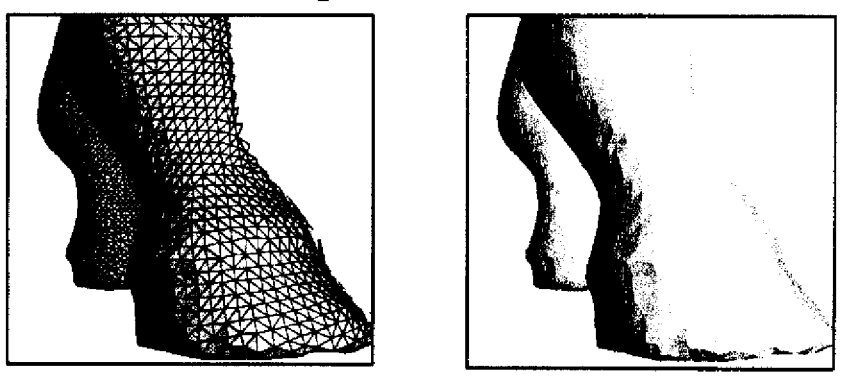

Comparisons were also made with semi-regular remeshes created according to approaches described in the Guskov and Lee II articles. FIG. 22A shows an example of views of an original irregular mesh. FIG. 22B shows views of a semi-regular remesh. FIG. 22C shows views of a reconstruction from a MCGIM, with improved sampling uniformity compared to the semi-regular remeshing.

For these comparisons, MCGIMs were created with rendering cost (i.e., number of vertices) no larger than those of the semi-regular meshes, although for greater geometric fidelity the number could have been higher. FIG. 23 shows that the PSNR results with MCGIMs are approximately 3 db higher than those of the semi-regular meshes, representing a 30% reduction in Hausdorff error (a binary image metric).

C. Selecting the Number of Charts

The number of charts used in an MCGIM influences geometric accuracy and rendering performance. FIG. 24 illustrates MCGIM accuracy as a function of the number of charts. The chart indicates accuracy as the number of charts grows exponentially for the horse model, with $128^2$ samples. MCGIM accuracy exhibits a rough "hill" shape as the number of charts increases. Noise in the graph data comes from optimization procedures involved in chartification, parameterization, zippering, and packing. Ultimately, however, the graph's shape comes from two countervailing trends: MCGIMs with fewer charts use less gutter space and unify fewer samples; MCGIMs with more charts produce less parametric distortion and more efficient packings. Thus, an optimal number of charts may exist for a given model, but good geometric accuracy is likely obtained over a broad range for the number of charts.

VI. Conclusion

Multi-chart geometry images provide a new surface representation that extends the geometry images. MCGIMs have the same regular grid structure of GIMs, except that some of their image samples are undefined. This permits partitioning of the model into charts, and thus attains the flexibility needed to parameterize meshes of arbitrary complexity, high genus, and multiple components with less distortion.

MCGIMs significantly exceed the geometric accuracy of GIMs for equivalent memory cost. This advantage improves even more when cost of undefined samples is ignored, which is what happens during reconstruction and rendering. MCGIMs also yield better geometric approximations than those of semi-regular remeshing.

MCGIMs may be subjected to level-of-detail control and compression, and may be rendered using graphics hardware, exploiting their simplicity in future architectural designs.

VII. Computing Environment

The above described mesh processing tool 200 (FIG. 2) and mesh processing and display techniques can be implemented on any of a variety of computing devices and environments, including computers of various form factors (personal, workstation, server, handheld, laptop, tablet, or other mobile), distributed computing networks, and Web services, as a few general examples. The graphical user interface with mesh reconstruction display can be implemented in hardware circuitry, as well as in mesh processing software 2580 executing within a computer or other computing environment, such as shown in FIG. 25.

FIG. 25 illustrates a generalized example of a suitable computing environment 2500 in which described techniques can be implemented. The computing environment 2500 is not intended to suggest any limitation as to scope of use or functionality of the invention, as the present invention may be implemented in diverse general-purpose or special-purpose computing environments. By way of example and not limitation, common implementations are in graphics cards and hardware and/or software graphics engines for personal computers, console game systems, and specialized graphics environments.

With reference to FIG. 25, the computing environment 2500 includes at least one processing unit 2510 and memory 2520. In FIG. 25, this most basic configuration 2530 is included within a dashed line. The processing unit 2510 executes computer-executable instructions and may be a real or a virtual processor. In a multi-processing system, multiple processing units execute computer-executable instructions to increase processing power. The memory 2520 may be volatile memory (e.g., registers, cache, RAM), non-volatile memory (e.g., ROM, EEPROM, flash memory, etc.), or some combination of the two. The memory 2520 stores software 2580 implementing MCGIM processing.

A computing environment may have additional features. For example, the computing environment 2500 includes storage 2540, one or more input devices 2550, one or more output devices 2560, and one or more communication connections 2570. An interconnection mechanism (not shown) such as a bus, controller, or network interconnects the components of the computing environment 2500. Typically, operating system software (not shown) provides an operating environment for other software executing in the computing environment 2500, and coordinates activities of the components of the computing environment 2500.

The storage 2540 may be removable or non-removable, and includes magnetic disks, magnetic tapes or cassettes, CD-ROMs, CD-RWs, DVDs, or any other medium which can be used to store information and which can be accessed within the computing environment 2500. The storage 2540 stores instructions for the software 2580 implementing MCGIM processing.

The input device(s) 2550 may be a touch input device such as a keyboard, mouse, pen, or trackball, a voice input device, a scanning device, or another device that provides input to the computing environment 2500. For audio, the input device(s) 2550 may be a sound card or similar device that accepts audio input in analog or digital form, or a CD-ROM reader that provides audio samples to the computing environment. For sampling geometry, the input device(s) may be, for example, a mechanical, optical, or other scanner. The output device(s) 2560 may be a display, printer, speaker, CD-writer, or another device that provides output from the computing environment 2500.

The communication connection(s) 2570 enable communication over a communication medium to another computing entity. The communication medium conveys information such as computer-executable instructions, geometry, texture or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The mesh processing techniques herein can be described in the general context of computer-readable media. Computer-readable media are any available media that can be accessed within a computing environment. By way of example, and not limitation, with the computing environment 2500, computer-readable media include memory 2520, storage 2540, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A computer-readable memory storing computer-executable instructions for causing a computer system programmed thereby to perform a method of zippering boundaries between charts for a mesh, the method comprising:
   identifying a plurality of charts for a mesh having a reference surface; and
   closing one or more cracks between the plurality of charts for a reconstruction of the mesh, wherein the closing is based at least in part on the reference surface;
   wherein the closing comprises:
      identifying a plurality of cut-nodes in the plurality of charts, where each of the plurality of cut-nodes comprise a mesh vertex with at least three adjacent charts; and
      mapping each cut-node to a closest boundary sample in the plurality of charts in terms of 3D distance from the cut-node.

2. The computer-readable memory of claim 1 wherein the plurality of charts are in a multi-chart geometry image.

3. The computer-readable memory of claim 1 wherein at least one of the plurality of charts has an irregular boundary but not a regularly sampled interior.

4. A computer-readable memory storing computer-executable instructions for causing a computer system programmed thereby to perform a method of zippering boundaries between charts for a mesh, the method comprising:
   identifying a plurality of charts for a mesh having a reference surface; and
   closing one or more cracks between the plurality of charts for a reconstruction of the mesh, wherein the closing is based at least in part on the reference surface;
   wherein the closing comprises:
   identifying one or more cut paths between adjacent charts of the plurality of charts, wherein each of the one or more cut paths comprises at least a continuous cut path and a pair of discrete cut paths for the respective adjacent charts; and snapping together boundaries of the adjacent charts on the pair of discrete cut paths.

5. The computer-readable memory of claim 4 wherein the plurality of charts are in a multi-chart geometry image.

6. The computer-readable memory of claim 4 wherein at least one of the plurality of charts has an irregular boundary but not a regularly sampled interior.

7. A computer-readable memory storing computer-executable instructions for causing a computer system programmed thereby to perform a method of zippering boundaries between charts for a mesh, the method comprising:

identifying a plurality of charts for a mesh having a reference surface; and closing one or more cracks between the plurality of charts for a reconstruction of the mesh, wherein the closing is based at least in part on the reference surface;

wherein the closing comprises:

clustering each of plural subsets of boundary samples in adjacent charts of the plurality of charts to seal gaps.

8. The computer-readable memory of claim 7 wherein the clustering comprises:

visiting plural boundary samples along two discrete cut paths; and assigning at least one of the plural boundary samples to a cluster according to a selection mechanism.

9. The computer-readable memory of claim 7 wherein the plurality of charts are in a multi-chart geometry image.

10. The computer-readable memory of claim 7 wherein at least one of the plurality of charts has an irregular boundary but not a regularly sampled interior.

11. A computer-implemented method of rendering comprising:

receiving a geometry image; and forming a reconstruction for a mesh based at least in part upon the geometry image, including handling one or more undefined samples in the geometry image;

wherein the forming comprises traversing the geometry image and forming triangles of the reconstruction according to plural rules, and wherein the plural rules include:

forming no triangle if less than three samples are defined in a 2-by-2 set of samples, forming one triangle if three samples are defined in the 2-by-2 set of samples, and forming two triangles if four samples are defined, wherein a diagonal separates the two triangles in the 2-by-2 set.

12. The method of claim 11 wherein the geometry image includes plural charts having regularly sampled interiors, thereby reducing memory accesses during the forming.

13. The method of claim 11 wherein the geometry image includes plural defined samples for plural charts and plural undefined samples separating the plural charts.

14. The method of claim 11 wherein the geometry image is rectangular.

15. The method of claim 11 wherein the reconstruction is a partial reconstruction of the mesh.

16. A computer-readable memory storing computer-executable instructions for causing a computer system programmed thereby to perform the method of claim 11.

17. A graphics device including one or more of hardware and software logic for performing the method of claim 11.

* * * * *

UNITED STATES PATENT AND TRADEMARK OFFICE
CERTIFICATE OF CORRECTION

| | | |
|---|---|---|
| PATENT NO. | : 7,265,752 B2 | Page 1 of 13 |
| APPLICATION NO. | : 10/755206 | |
| DATED | : September 4, 2007 | |
| INVENTOR(S) | : Sander et al. | |

It is certified that error appears in the above-identified patent and that said Letters Patent is hereby corrected as shown below:

Delete Drawing sheets 1-12, and substitute therefor the Drawing Sheets, consisting of FIGS. 1A - FIGS. 22C as shown on the attached pages.

Signed and Sealed this

Twenty-fourth Day of March, 2009

JOHN DOLL
*Acting Director of the United States Patent and Trademark Office*

701

702

703

Figure 16A
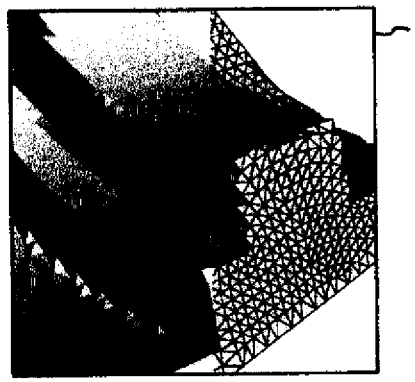
Figure 16B
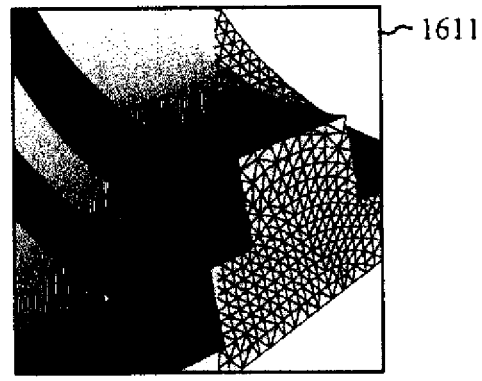

UNITED STATES PATENT AND TRADEMARK OFFICE
CERTIFICATE OF CORRECTION

PATENT NO. : 7,265,752 B2  
APPLICATION NO. : 10/755206  
DATED : September 4, 2007  
INVENTOR(S) : Sander et al.

It is certified that error appears in the above-identified patent and that said Letters Patent is hereby corrected as shown below:

Drawing Sheets 1-19, consisting of FIGS. 1A-25 (as deleted by Certificate of Correction issued March 24, 2009) are to be reinstated (attached).

Column 6, line 63, add: -- The patent or application file contains at least one drawing executed in color. Copies of this patent or patent application publication with color drawing(s) will be provided by the Office upon request and payment of the necessary fee. --

This certificate supersedes the Certificate of Correction issued March 24, 2009.

Signed and Sealed this

Fourteenth Day of April, 2009

JOHN DOLL  
*Acting Director of the United States Patent and Trademark Office*

Figure 16A
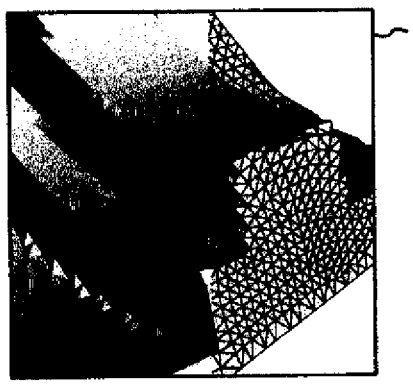
1601
1602
Figure 16B
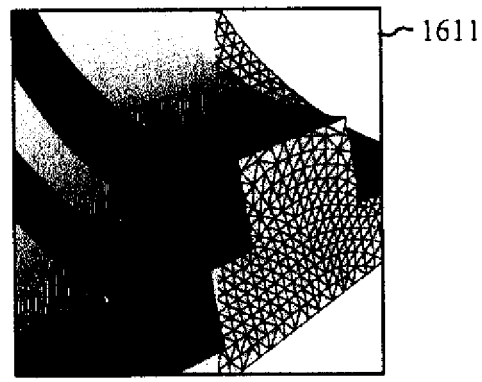
1611
1612

Figure 17

| models | gargoyle | horse | dragon | feline |
|---|---|---|---|---|
| genus | 0 | 0 | 1 | 2 |
| 257x257 GIM from the Gu article | | | | |
| stretch efficiency | 67.8% | 32.4% | 42.2% | 33.3% |
| # defined vertices | 66,049 | 66,049 | 66,049 | 66,049 |
| # unique vertices | 65,537 | 65,537 | 65,537 | 65,537 |
| geometry PSNR | 79.4 | 73.4 | 70.2 | 68.0 |
| normal PSNR | 30.3 | 19.4 | 20.1 | 17.6 |
| 257x257 GIM from the Gu article + geometry image optimization | | | | |
| geometry PSNR | 83.5 | 71.9 | 73.6 | 68.1 |
| normal PSNR | 31.5 | 18.9 | 19.6 | 17.0 |
| MCGIM (equivalent memory cost as the Gu article) | | | | |
| # charts | 15 | 25 | 40 | 50 |
| stretch efficiency | 98.7% | 99.2% | 92.7% | 99.1% |
| packing efficiency | 72.7% | 75.6% | 73.1% | 75.6% |
| dimensions | 466x138 | 281x228 | 369x174 | 478x133 |
| rectangle area | 64,308 | 64,068 | 64,206 | 63,574 |
| # defined vertices | 46,724 | 48,389 | 46,913 | 48,038 |
| # unique vertices | 41,961 | 41,857 | 38,516 | 35,956 |
| geometry PSNR | 83.8 | 84.6 | 77.9 | 79.5 |
| normal PSNR | 33.7 | 30.8 | 22.9 | 28.7 |
| MCGIM (equivalent rendering cost as the Gu article) | | | | |
| # unique vertices | 58,769 | 55,329 | 52,059 | 55,329 |
| geometry PSNR | 85.2 | 85.3 | 79.4 | 82.5 |
| normal PSNR | 35.5 | 30.6 | 23.1 | 30.2 |

Geometry image comparison results

Figure 18C:
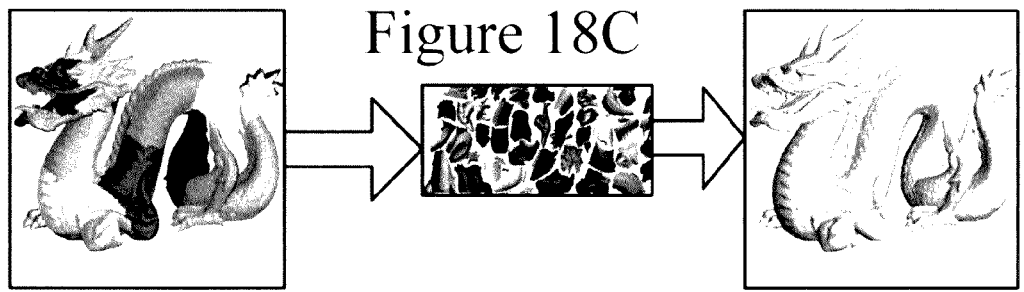
Figure 18D:
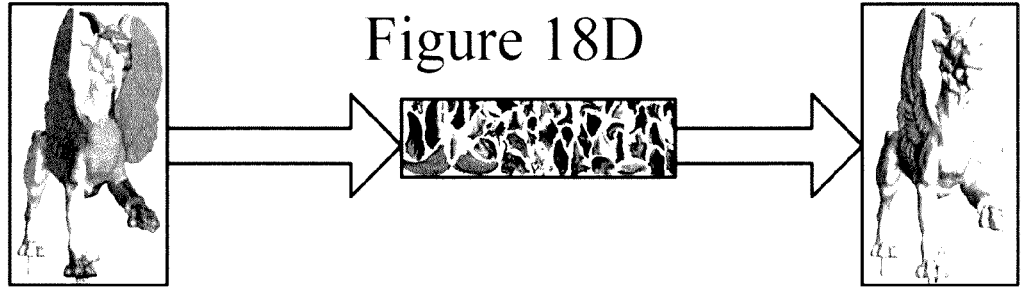

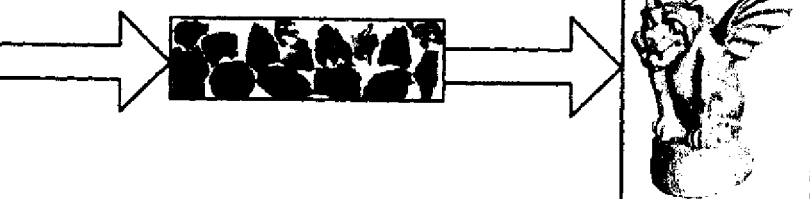
Figure 18A
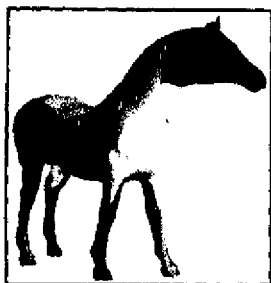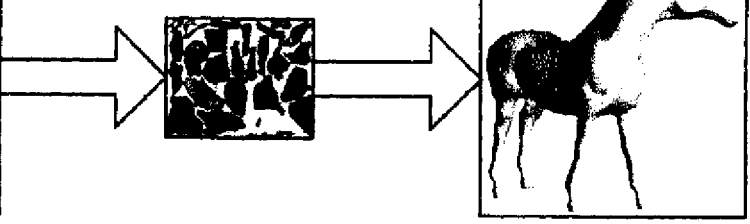
Figure 18B

Figure 18C
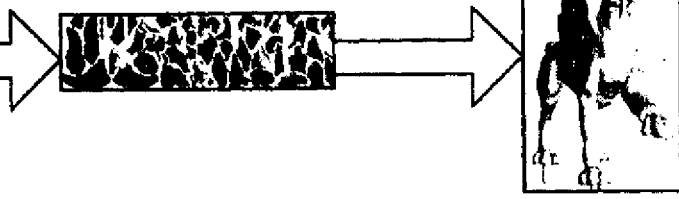
Figure 18D Figure 23
| | semi-regular meshes | | MCGIM approach | |
|---|---|---|---|---|
| | # unique vertices | geom. PSNR | # unique vertices | geom. PSNR |
| feline | 258,046 | 84.4 | 256,862 | 88.3 |
| horse | 112,642 | 87.8 | 99,851 | 90.2 |
Semi-regular remeshing comparison results
Figure 24
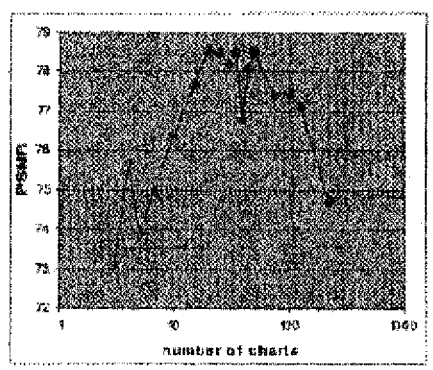
Figure 25
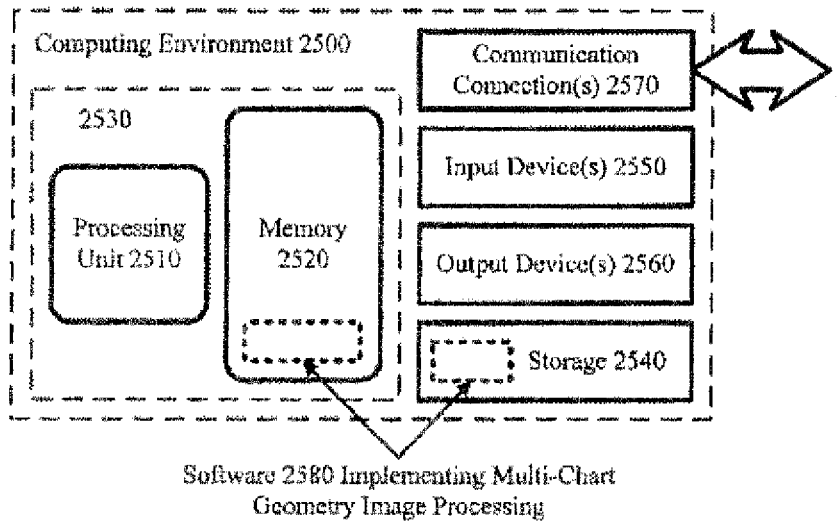
Software 2580 Implementing Multi-Chart Geometry Image Processing